United States Patent
Fukuhara et al.

(10) Patent No.: US 10,686,309 B2
(45) Date of Patent: Jun. 16, 2020

(54) TERMINAL ACCOMMODATING BODY AND WIRE HARNESS

(71) Applicant: Yazaki Corporation, Tokyo (JP)

(72) Inventors: Yosuke Fukuhara, Shizuoka (JP); Kazuki Iguchi, Shizuoka (JP); Tatsuya Tsubouchi, Shizuoka (JP); Makoto Nakayama, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 194 days.

(21) Appl. No.: 16/047,085

(22) Filed: Jul. 27, 2018

(65) Prior Publication Data

US 2018/0375312 A1 Dec. 27, 2018

Related U.S. Application Data

(63) Continuation of application No. PCT/JP2017/007957, filed on Feb. 28, 2017.

(30) Foreign Application Priority Data

Mar. 1, 2016 (JP) .................................. 2016-039313

(51) Int. Cl.
*H01R 13/40* (2006.01)
*H02G 3/16* (2006.01)
(Continued)

(52) U.S. Cl.
CPC .............. *H02G 3/16* (2013.01); *B60R 16/02* (2013.01); *B60R 16/0207* (2013.01); *H01R 9/2458* (2013.01); *H01R 13/42* (2013.01)

(58) Field of Classification Search
CPC ........ H02G 3/16; H01R 9/2458; H01R 13/42; B60R 16/0207
(Continued)

(56) References Cited

U.S. PATENT DOCUMENTS

| 5,763,827 A | 6/1998 | Sugiura |
| 2013/0252483 A1 | 9/2013 | Mochizuki |

FOREIGN PATENT DOCUMENTS

| JP | 07-022097 A | 1/1995 |
| JP | 09-252518 A | 9/1997 |

(Continued)

OTHER PUBLICATIONS

International Search Report for PCT/JP2017/007957 dated Apr. 4, 2017 (PCT/ISA/210).

*Primary Examiner* — Dimary S Lopez Cruz
(74) *Attorney, Agent, or Firm* — Sughrue Mion, PLLC

(57) ABSTRACT

A terminal accommodating body includes a terminal accommodating chamber for each coupling terminal capable of accommodating a coupling terminal capable of being electrically connected to a terminal of an electronic component, and a terminal holding portion that holds the coupling terminal. In all the terminal accommodating chambers, in a plurality of common accommodating chambers in which the coupling terminal and one terminal portion in a one plate-like bus bar having a plurality of terminal portions electrically connectable to the terminal of the electronic component are capable of being replaced and accommodated, and a partition wall between the adjacent common accommodating chambers has an inter-chamber inserting portion into which the coupling portion is inserted in an accommodated state of the terminal portion to the common accommodating chamber, in order to accommodate a coupling portion in the common accommodating chamber.

18 Claims, 25 Drawing Sheets

(51) Int. Cl.
*H01R 13/42* (2006.01)
*B60R 16/02* (2006.01)
*H01R 9/24* (2006.01)

(58) Field of Classification Search
USPC .......................................................... 174/59
See application file for complete search history.

(56) References Cited

FOREIGN PATENT DOCUMENTS

| | | |
|---|---|---|
| JP | 2002-034129 A | 1/2002 |
| JP | 2012-124149 A | 6/2012 |

US 10,686,309 B2

TERMINAL ACCOMMODATING BODY AND WIRE HARNESS

CROSS-REFERENCE TO RELATED APPLICATION(S)

This application is a continuation application of International Application PCT/JP2017/007957, filed on Feb. 28, 2017, and designating the U.S., the entire contents of which are incorporated herein by reference.

BACKGROUND OF THE INVENTION

1. Field of the Invention

The present invention relates to a terminal accommodating body and a wire harness.

2. Description of the Related Art

From related art, a terminal accommodating body which accommodates and holds a predetermined terminal has been known. The predetermined terminal electrically connects at least a terminal of an electronic component (such as a fuse or a relay) as a counterpart terminal. Specifically, as the predetermined terminal, there are a terminal (hereinafter referred to as "harness terminal") which is electrically connected to an end portion of an electric wire by crimping, welding or the like, and is electrically connected to a terminal of an electronic component as a counterpart terminal, a relay terminal interposed between a harness terminal as a counterpart terminal and a terminal of an electronic component as a counterpart terminal, a bus bar having at least a terminal portion to which the terminal of the electronic component as a counterpart terminal is electrically connected, and the like. Hereinafter, the harness terminal or the relay terminal will be referred to as a "coupling terminal". The electronic component is connected to the terminal accommodating body via at least the coupling terminal and the bus bar. This kind of terminal accommodating body is described in Japanese Patent Application Laid-open No. 7-22097 and Japanese Patent Application Laid-open No. 9-252518.

Meanwhile, for example, among vehicles that are related to each other, such as vehicles having the same model but different specifications, the electronic components connected to the terminal accommodating body may be different types or even in the same kind of electronic components, its quantity may be different. For this reason, between the respective vehicles, only the coupling terminal is accommodated in the terminal accommodating body of one vehicle and at least the bus bar is accommodated in the terminal accommodating body of the other vehicle. Therefore, conventionally, for example, for each specification of a vehicle, it is necessary to prepare a terminal accommodating body including only an accommodating chamber of the coupling terminal and a terminal accommodating body having at least an accommodating chamber of the bus bar.

SUMMARY OF THE INVENTION

An object of the present invention is to provide a terminal accommodating body and a wire harness in which a terminal accommodating chamber can be shared by the coupling terminal and the bus bar.

A terminal accommodating body according to one aspect of the present invention includes a terminal accommodating chamber that is a space capable of accommodating a coupling terminal capable of being electrically connected to a terminal of an electronic component, and is provided for each of the plurality of coupling terminals; and a terminal holding portion that holds the coupling terminal accommodated in the terminal accommodating chamber, wherein in all the terminal accommodating chambers, a plurality of common accommodating chambers in which the coupling terminal and one terminal portion in a one plate-like bus bar having a plurality of terminal portions electrically connectable to the terminal of the electronic component are capable of being replaced and accommodated are set, the plurality of common accommodating chambers being allocated to each of the terminal portions of the bus bar, and a partition wall between the adjacent common accommodating chambers has an inter-chamber inserting portion into which the coupling portion is inserted in an accommodated state of the terminal portion to the common accommodating chamber, in order to accommodate a coupling portion for connecting the adjacent terminal portions of the bus bar in the common accommodating chamber, and the terminal holding portion of the common accommodating chamber is provided for each of the common accommodating chambers so as not to obstruct accommodation of the bus bar to the common accommodating chamber and the inter-chamber inserting portion.

According to another aspect of the present invention, in the terminal accommodating body, it is preferable that the terminal holding portion is a locking portion which protrudes in the terminal accommodating chamber and locks a locked portion of the coupling terminal accommodated in the terminal accommodating chamber, and in the terminal holding portion of the common accommodating chamber or between the terminal holding portion and an inner wall surface of the common accommodating chamber, an interior inserting portion into which the bus bar is inserted in an accommodated state of the terminal portion to the common accommodating chamber is formed.

According to still another aspect of the present invention, in the terminal accommodating body, it is preferable that when a bus bar holding portion for holding the bus bar is provided in the common accommodating chamber or the inter-chamber inserting portion, the bus bar holding portion is a locking portion which protrudes from a wall surface existing inside the common accommodating chamber or a wall surface of the inter-chamber inserting portion, and locks the locked portion of the bus bar when the terminal portion is accommodated in the common accommodating chamber, and the bus bar holding portion is disposed so as not to obstruct accommodation of the coupling terminal to the common accommodating chamber.

According to still another aspect of the present invention, it is preferable that the terminal accommodating body further includes at least a first accommodating chamber group in which the plurality of terminal accommodating chambers is arranged in a row, and a second accommodating chamber group in which the same number of the common accommodating chambers paired individually with the respective terminal accommodating chambers of the first accommodating chamber group are arranged in a row, wherein the inter-chamber inserting portion is provided in the partition wall between the adjacent common accommodating chambers of the second accommodating chamber group.

According to still another aspect of the present invention, in the terminal accommodating body, it is preferable that a plurality of electrical connecting spaces including all the terminal accommodating chambers is arranged side by side, and is formed to be able to accommodate one plate-like junction bus bar over at least two adjacent electrical connecting spaces in the plurality of electrical connecting spaces, in the respective common accommodating chambers in the two adjacent electrical connecting spaces, at least one common accommodating chamber of one electrical connecting space and at least one common accommodating chamber of the other electrical connecting space are used as junction accommodating chambers, and each of the junction accommodating chambers is formed so that the coupling terminal, one terminal portion of the bus bar, and one terminal portion of the junction bus bar are capable of being replaced and accommodated, and between the adjacent junction accommodating chambers of one electrical connecting space and the adjacent junction accommodating chambers of the other electrical connecting space, an inter-chamber communicating portion which allows the chambers of the respective junction accommodating chambers to communicate with each other and accommodates a coupling portion which connects the adjacent terminal portions of the junction bus bar is provided.

According to still another aspect of the present invention, in the terminal accommodating body, it is preferable that the electrical connecting space includes a power supply terminal accommodating chamber which accommodates a power supply terminal electrically connected to a power supply, and the power supply terminal accommodating chamber is formed so that at least the power supply terminal portion of the bus bar and the power supply terminal portion of the junction bus bar can be replaced and can be accommodated together with the power supply terminal, and any one of the power supply terminal portions in the bus bar and the junction bus bar in the chamber can be electrically connected to the power supply terminal.

According to still another aspect of the present invention, in the terminal accommodating body, it is preferable that the two electrical connecting spaces are provided.

A wire harness according to still another aspect of the present invention includes an electronic component; a terminal accommodating body that is a space capable of accommodating a coupling terminal capable of being electrically connected to a terminal of the electronic component, the terminal accommodating body having a terminal accommodating chamber provided for each of the plurality of coupling terminals, and a terminal holding portion which holds the coupling terminal accommodated in the terminal accommodating chamber; and an electric wire that is directly or indirectly electrically connected to the coupling terminal, wherein in all the terminal accommodating chambers, a plurality of common accommodating chambers in which the coupling terminal and one terminal portion in a one plate-like bus bar having a plurality of terminal portions electrically connectable to the terminal of the electronic component are capable of being replaced and accommodated are set, the plurality of common accommodating chambers being allocated to each of the terminal portions of the bus bar, and a partition wall between the adjacent common accommodating chambers has an inter-chamber inserting portion into which the coupling portion is inserted in an accommodated state of the terminal portion to the common accommodating chamber, in order to accommodate a coupling portion for connecting the adjacent terminal portions of the bus bar in the common accommodating chamber, and the terminal holding portion of the common accommodating chamber is provided for each of the common accommodating chambers so as not to obstruct accommodation of the bus bar to the common accommodating chamber and the inter-chamber inserting portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a terminal accommodating body and a wire harness according to the present invention will be described in detail with reference to the drawings. It should be noted that the present invention is not limited by this embodiment.

Embodiment

An embodiment of a terminal accommodating body and a wire harness according to the present invention will be described with reference to FIGS. 1 to 10.

Figure 1:
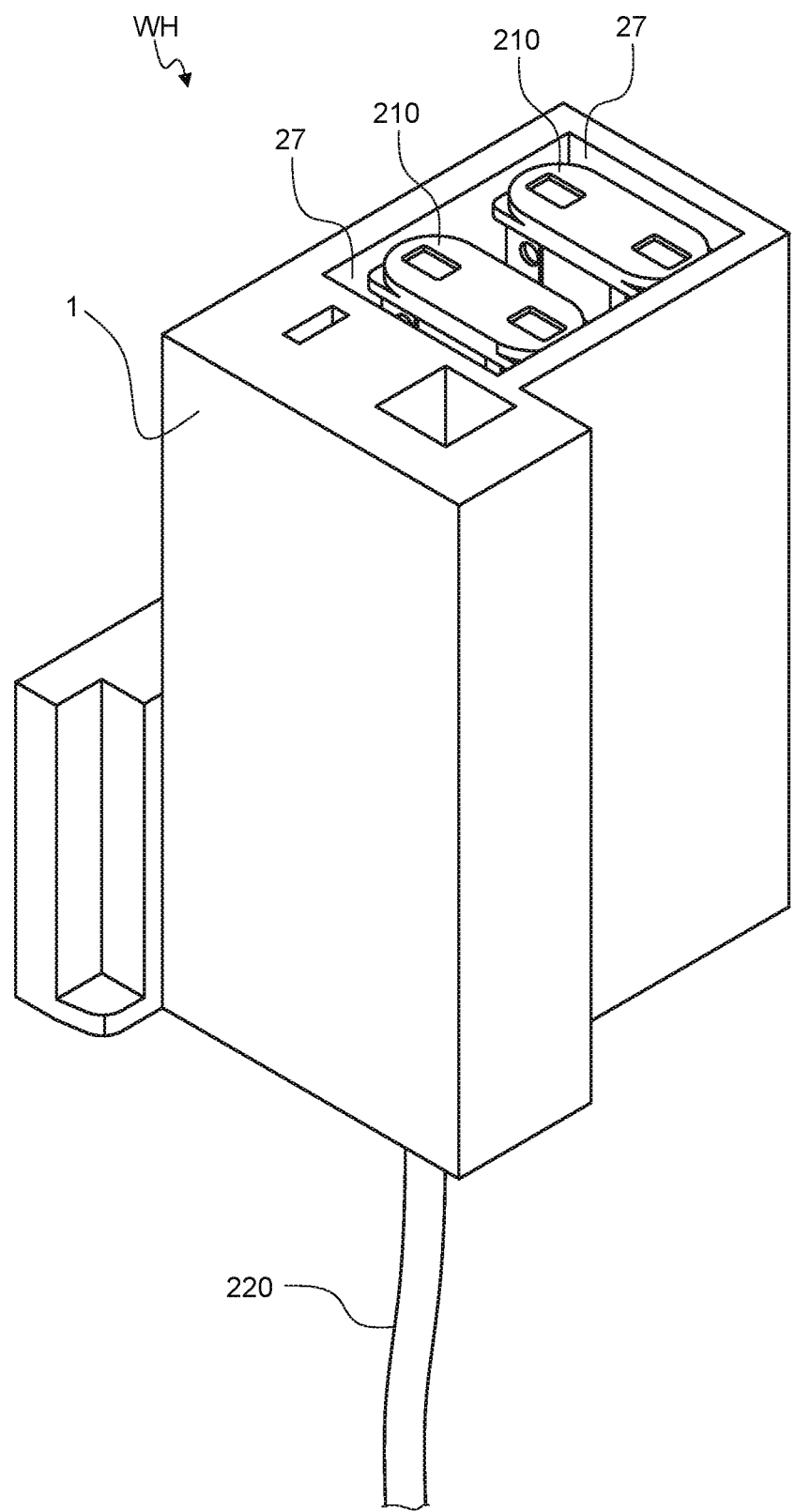
FIG. 1 is a perspective view illustrating a terminal accommodating body and a wire harness according to an embodiment.

Reference numeral 1 of FIG. 1 denotes a terminal accommodating body of this embodiment. Reference numeral WH of FIG. 1 denotes a wire harness including the terminal accommodating body 1.

Figure 2:
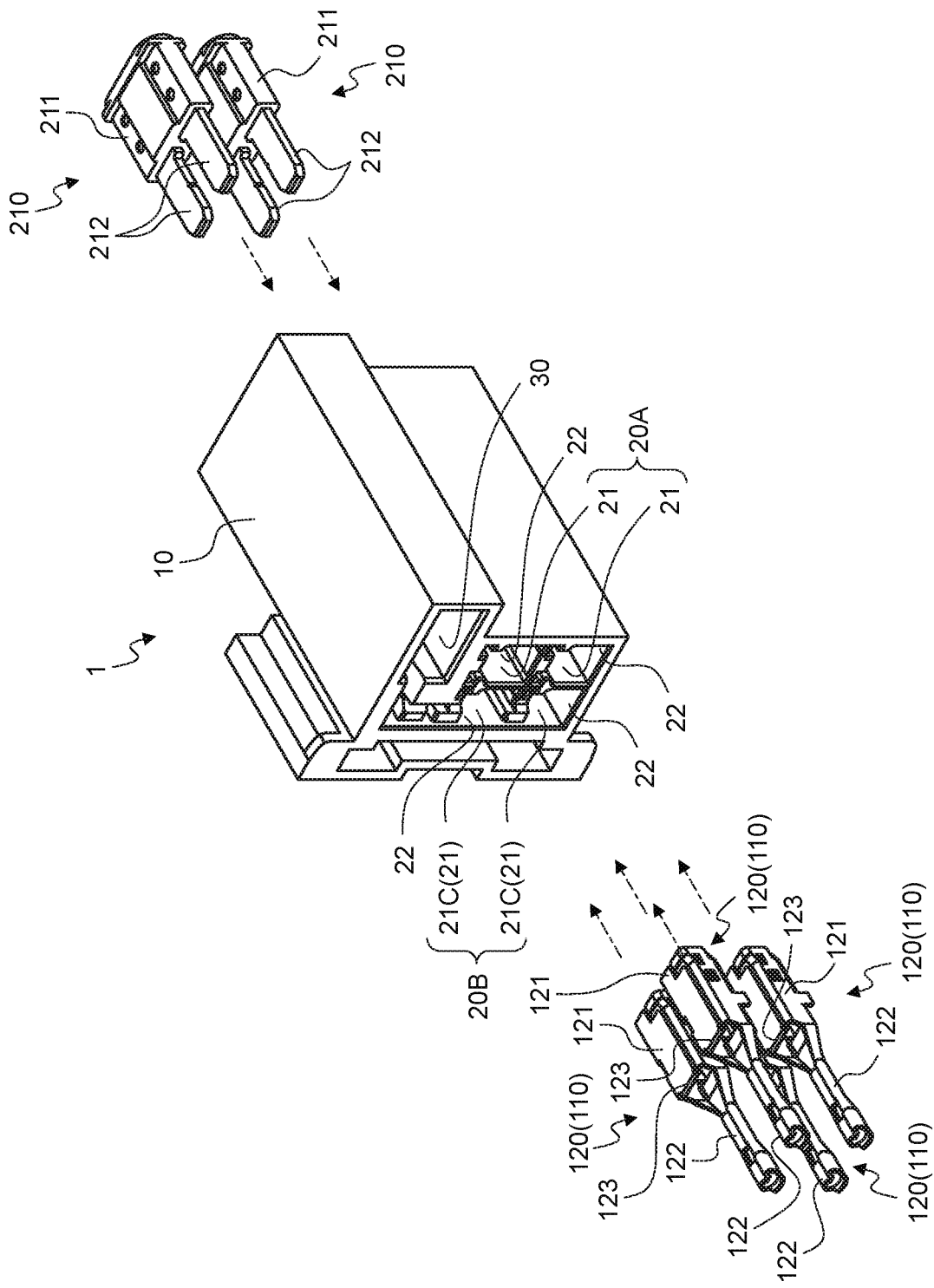
FIG. 2 is an exploded perspective view illustrating a terminal accommodating body, and a coupling terminal and an electronic component accommodated in the terminal accommodating body.
Figure 3:
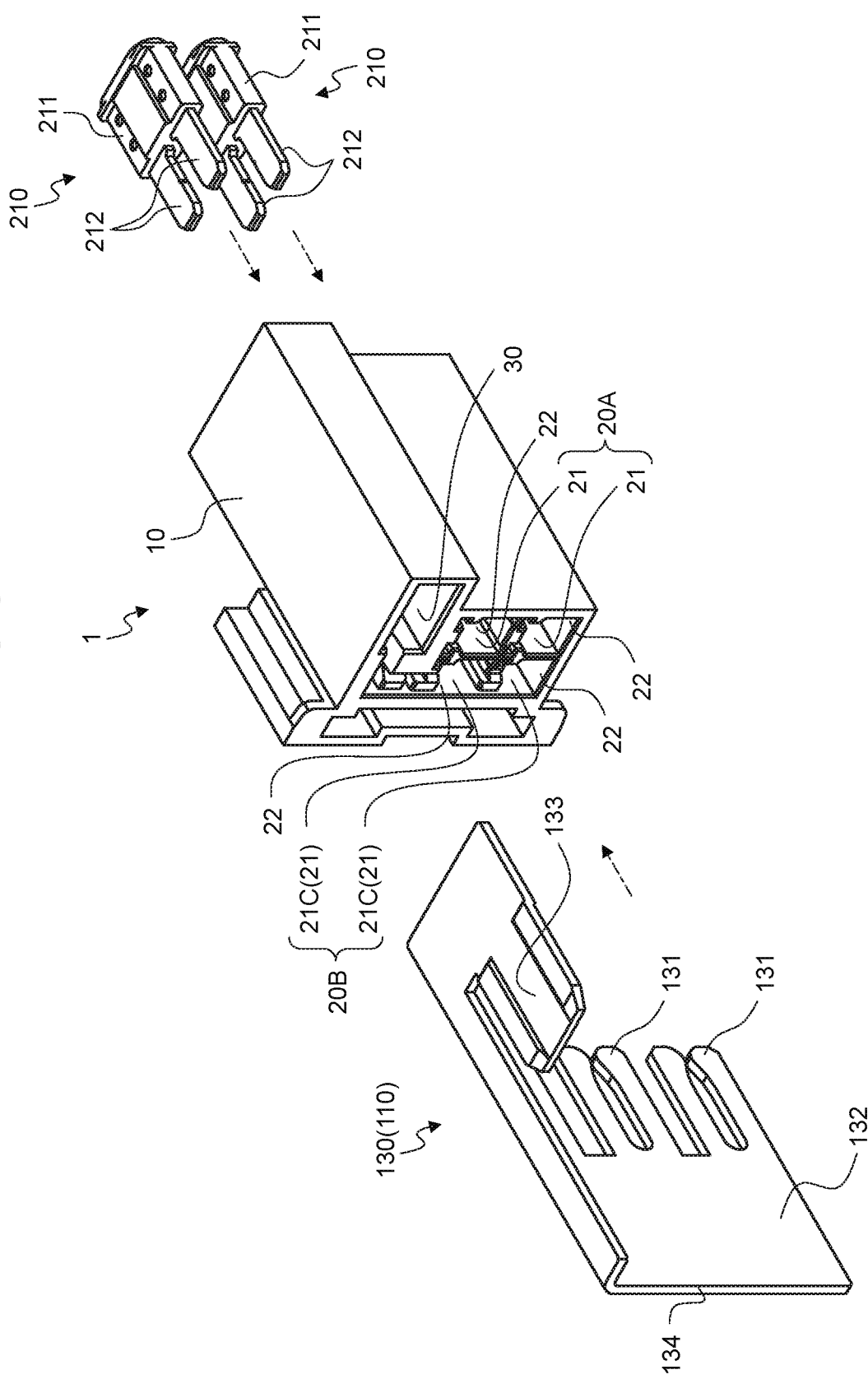
FIG. 3 is an exploded perspective view illustrating the terminal accommodating body and a bus bar and an electronic component accommodated in the terminal accommodating body.
Figure 4:
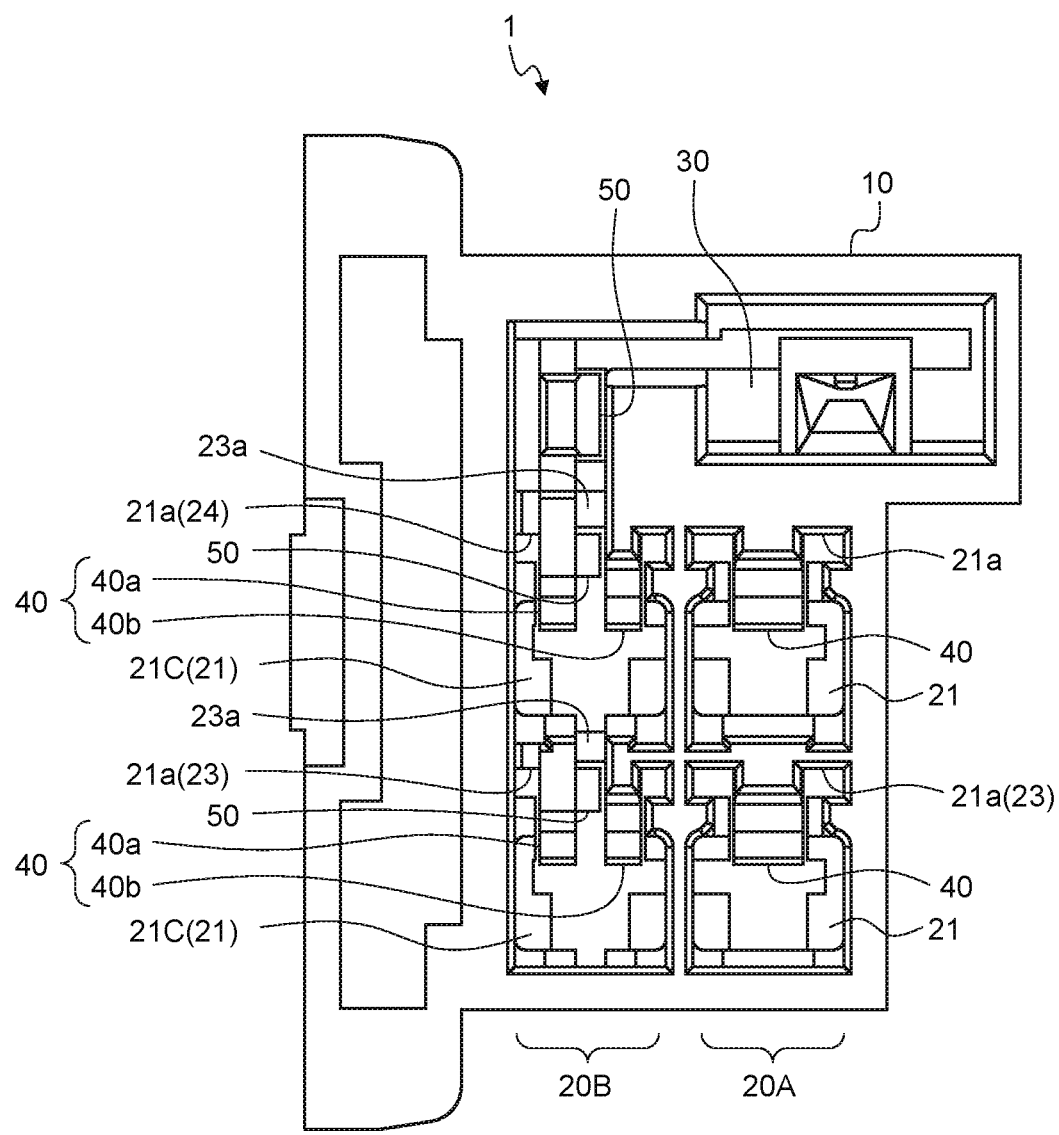
FIG. 4 is a front view of the terminal accommodating body as seen from an inserting port side of the terminal.
Figure 5:
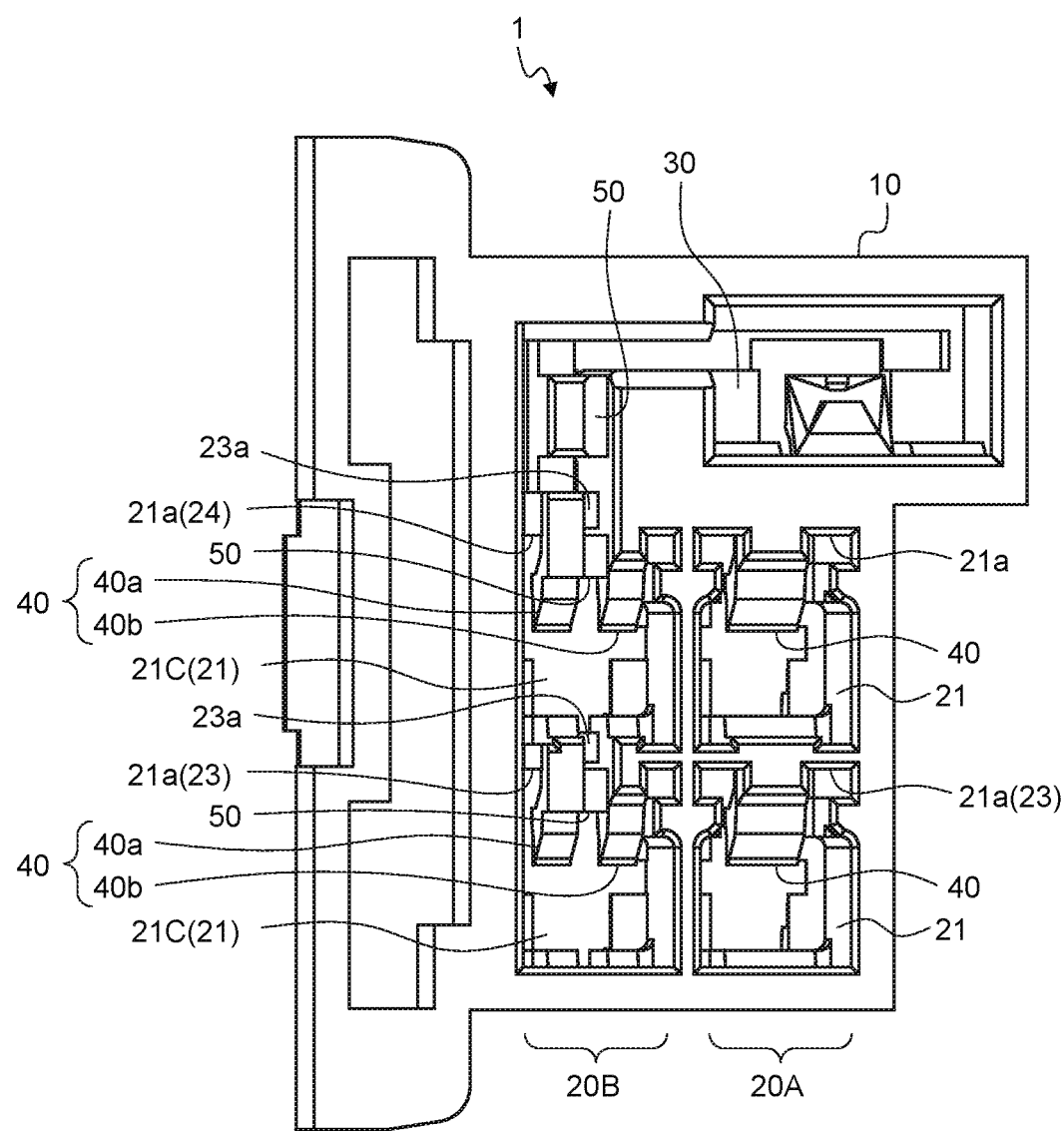
FIG. 5 is a perspective view of the terminal accommodating body as seen from the inserting port side of the terminal.

The terminal accommodating body 1 of the present embodiment is an accommodating member capable of accommodating and holding a predetermined terminal 110 therein (FIGS. 2 and 3). The predetermined terminal 110 is a terminal which at least uses the terminal 212 of the electronic component 210 as a counterpart terminal to be connected and enables electrical connection to the terminal 212. Specifically, a coupling terminal 120 (FIG. 2) capable of being detachably connected to the terminal 212 of the electronic component 210 and a terminal portion 131 (FIG. 3) of the plate-like bus bar 130 correspond to the terminal 110. Further, in FIGS. 2 and 3, an electric wire 220 to be described later is omitted.

Here, the electronic component 210 is provided with an electronic component main body 211, and a terminal 212 electrically connected to the electronic component main body 211. For example, as the electronic component 210, a circuit protection component (such as a fuse), a relay, a connector, an electronic device {such as electronic control unit (so-called ECU)} or the like is considered. The electronic component 210 of this example is a fuse, and the terminal 212 is formed into a plate-like male type.

Further, as described above, the coupling terminal 120 is a harness terminal electrically connected to the end portion of the electric wire 220 (FIG. 1) by crimping, welding or the like, and is a terminal in which the terminal 212 of the electronic component 210 is used as a counterpart terminal or the harness terminal and the terminal 212 of the electronic component 210 are used as counterpart terminals, respectively, and a relay terminal is interposed therebetween and electrically connects each other. The coupling terminal 120 is formed into a predetermined shape capable of being physically connected to a counterpart terminal, for example, using a conductive metal plate material (for example, a copper plate) as a base material. The coupling terminal 120 may be a male terminal or may be a female terminal. The coupling terminal 120 has at least a terminal connecting portion 121 that can be electrically connected to the counterpart terminal (FIG. 2). The terminal connecting portion 121 is appropriately formed into a shape corresponding to the terminal form (male type or female type) of the coupling terminal 120. In the case of a harness terminal, at least one terminal connecting portion 121 is provided. In the case of a relay terminal, at least two terminal connecting portions 121 are provided.

The coupling terminal 120 of this example is a harness terminal and is electrically connected to one counterpart terminal. Therefore, one terminal connecting portion 121 and an electric wire connecting portion 122 electrically connected to the electric wire 220 are provided in the coupling terminal 120. In this example, the terminal connecting portion 121 is formed into a female type in accordance with the counterpart terminal of the male type (terminal 212), and the electric wire connecting portion 122 is formed to crimp the electric wire 220.

Further, the bus bar 130 is, for example, a plate-like member molded from a conductive metal plate material (for example, copper plate) as a base material, and is able to electrically connect a plurality of counterpart terminals (terminals 212 of the electronic component 210). The bus bar 130 has a terminal portion 131 and a coupling portion 132 (FIG. 3). The terminal portion 131 is a portion which enables electrical connection to the counterpart terminal, and a plurality of terminal portion 131 is provided in accordance with the number of counterpart terminals to be connected. The coupling portion 132 is a portion which connects the plurality of terminal portions 131, and connects the adjacent terminal portions 131 to each other. The terminal portion 131 of this example is formed as a plate-like tuning fork terminal in accordance with the counterpart terminal of the male type (terminal 212). Each of the terminal portions 131 is arranged in a line at intervals on the same plane so as to make the connection directions with the respective counterpart terminals match with each other. The coupling portion 132 of this example is a rectangular plate-like portion which connects the roots of each terminal portion 131 (the end portion on the side opposite to the side on which the counterpart terminal is inserted) on the same plane.

Here, the bus bar 130 of this example has another plate-like portion that intersects with the terminal portion 131 and the coupling portion 132 on the same plane, and this plate-like portion is used as an electric wire connecting portion 133 electrically connected to the electric wire 220. The electric wire connecting portion 133 may be, for example, a terminal portion electrically connected to a harness terminal (not illustrated) (different from the above-described coupling terminal 120) of the electric wire 220, and may electrically connect the end portions of the electric wire 220 by welding the end portions. In this example, the electric wire connecting portion 133 as a terminal portion is provided. For example, when power is supplied to the electronic component 210 side via the bus bar 130, the electric wire connecting portion 133 of the bus bar 130 serves as a power supply terminal portion 133, and the power supply terminal portion 133 is electrically connected to a power supply side to be described later. Therefore, in this case, the harness terminal fitted to the power supply terminal portion 133 serves as a power supply terminal (not illustrated), and the power supply terminal thereof is electrically connected to the power supply side via the electric wire 220.

The terminal accommodating body 1 is configured as, for example, an electrical connecting box or a connecting body (such as a so-called block) interposed between the electronic component 210 and the electric wire 220.

The electrical connecting box has a box body in which at least the terminal 110 and the electronic component 210 are accommodated and held, and electrically connects the terminal 110 and the terminal 212 of the electronic component 210 to each other therein. In the electrical connecting box, the electric wire 220 directly or indirectly and electrically connected to the terminal 110 is drawn out to the outside. The wire harness WH includes at least the electrical connecting box, the terminal 110, the electronic component 210, and the electric wire 220. For example, the wire harness WH is, for example, disposed on the vehicle and is connected via electric wires 220 allocated to a power supply (secondary battery) side (not illustrated) or an electric device (such as an actuator) as a load.

When the terminal accommodating body 1 is configured as a connecting body, for example, the end portion of the electric wire 220 and the coupling terminal 120 (harness terminal) are accommodated in the connecting body (the terminal accommodating body 1), and the electric wire 220 is drawn out of the connecting body (the terminal accommodating body 1). Thus, it is possible to form a connector to be connected to the electronic component 210. Further, when the terminal accommodating body 1 is configured as a separate connecting body from this, for example, by holding a plurality of electronic components 210 on the connecting body (the terminal accommodating body 1), it is possible to form an electronic component unit which is an assembly of the plurality of electronic components 210. In the electronic component unit, by accommodating and holding the coupling terminal 120 (harness terminal) inside the connecting body (the terminal accommodating body 1), the coupling terminal 120 is electrically connected to the terminal 212 of the electronic component 210. Further, the connecting body (the terminal accommodating body 1) may be accommodated and held inside the box of the electrical connecting box.

Specifically, the terminal accommodating body 1 has a main body 10 formed of an insulating material such as a synthetic resin (FIGS. 2 and 3). In the main body 10, as a space capable of accommodating the coupling terminal 120, a terminal accommodating chamber 21 provided for each of the plurality of coupling terminals 120 is formed. In the terminal accommodating body 1 of this example, all the terminal accommodating chambers 21 are formed in a rectangular shape. Each of the terminal accommodating chambers 21 is formed so that the inserting directions of the coupling terminals 120 become the same direction. The coupling terminals 120 are inserted into the terminal accommodating chambers 21 from the terminal connecting portion 121 side via an inserting port 22.

The terminal accommodating body 1 of this example has at least a first accommodating chamber group 20A and a second accommodating chamber group 20B in which a plurality of terminal accommodating chambers 21 is arranged in a row (FIGS. 2 and 3). In the first accommodating chamber group 20A and the second accommodating chamber group 20B, a plurality of terminal accommodating chambers 21 is arranged in a direction orthogonal to the inserting direction of the coupling terminals 120. The first accommodating chamber group 20A and the second accommodating chamber group 20B have a plurality of combinations of the terminal accommodating chambers 21 that are paired while being adjacent to each other between the first accommodating chamber group 20A and the second accommodating chamber group 20B. For example, the second accommodating chamber group 20B of this example has the same number of terminal accommodating chambers 21 that are paired individually with the respective terminal accommodating chambers 21 of the first accommodating chamber group 20A. In other words, in the terminal accommodating body 1 of this example, the respective terminal accommodating chambers 21 are arranged in a lattice pattern. One of the two coupling terminals 120 accommodated in the paired terminal accommodating chambers 21 is electrically connected to one terminal 212 of the electronic component 210, and the other thereof is electrically connected to the other terminal 212 of the electronic component 210.

Incidentally, as described above, between the vehicles correlated with each other, the terminal accommodating body in which only the terminal 110 is accommodated, and the terminal accommodating body in which at least the bus bar 130 is accommodated may be properly used.

For example, conventionally, when only a low voltage is applied, it is possible to connect the electric wire 220 connected to the coupling terminal 120 (harness terminal), with respect to the terminal 212 of the electronic component 210 corresponding to the low voltage. In this case, a plurality of terminal accommodating chambers for each coupling terminal 120 corresponding to the terminals 212 of the electronic component 210 are formed in the terminal accommodating body. In contrast, when a high voltage is applied, the bus bar 130 capable of supplying power with higher efficiency than the electric wire 220 may be connected to the terminal 212 of the electronic component 210 corresponding to the high voltage. In this case, a terminal accommodating chamber in which the bus bar 130 is accommodated is formed in the terminal accommodating body.

Further, for example, in a vehicle having a specification in which a small amount of fuses (the electronic components 210) are connected to the terminal accommodating body, a terminal accommodating body may be prepared in which the coupling terminals 120 are accommodated for each of the terminals 212 in accordance with the terminals 212 of positive and negative polarity of each fuse. In contrast, in a vehicle having a specification in which a larger number of fuses than this vehicle, for example, in view of the accommodation workability of the coupling terminals 120 to the terminal accommodating bodies, a terminal accommodating body may be prepared in which the coupling terminal 120 for each fuse electrically connected to the terminal 212 of one polarity in the fuse, and one bus bar 130 electrically connected to the terminal 212 of the other polarity in each fuse are accommodated. A plurality of terminal accommodating chambers for each of the coupling terminals 120 and a terminal accommodating chamber for accommodating the bus bars 130 are formed in the terminal accommodating body of the vehicle.

As described above, conventionally, there is a case where it is necessary to prepare a terminal accommodating body of a different shape for each specification of the vehicle.

Therefore, the terminal accommodating body 1 of the present embodiment is configured so that the terminal accommodating chamber 21 can be shared by the coupling terminal 120 and the terminal portion 131 of the bus bar 130, and it is possible to accommodate the coupling terminal 120 or to accommodate the terminal portion 131 of the bus bar 130 with respect to the shared terminal accommodating chamber (hereinafter referred to as "common accommodating chamber") 21C, for example, in accordance with the specifications of the vehicle.

The terminal accommodating body 1 has a plurality of common accommodating chambers 21C which can replace and accommodate the coupling terminal 120 and one terminal portion 131 of one bus bar 130 and is allocated to each terminal portion 131 of the bus bar 130. In the terminal accommodating body 1, all the terminal accommodating chambers 21 may be set as the common accommodating chamber 21C, and some of plurality of terminal accommodating chambers 21 among all the terminal accommodating chambers 21 may be set as the common accommodating chamber 21C. In the terminal accommodating body 1 of the present embodiment, a plurality of terminal accommodating chambers 21 in at least one of the first accommodating chamber group 20A and the second accommodating chamber group 20B is formed as the common accommodating chamber 21C. In this example, each terminal accommodating chamber 21 of the first accommodating chamber group 20A is set as a space that can accommodate only the coupling terminal 120, and each terminal accommodating chamber 21 of the second accommodating chamber group 20B is formed as a common accommodating chamber 21C in which the coupling terminal 120 and the bus bar 130 can be replaced (FIGS. 2 to 5). The bus bar 130 of this example is inserted into each common accommodating chamber 21C in the same direction as the inserting direction of the coupling terminal 120.

In the terminal accommodating body 1, in the plurality of common accommodating chambers 21C inside all the terminal accommodating chambers 21 and on a partition wall 23 between the adjacent common accommodating chambers 21C, an inserting portion (hereinafter referred to as "inter-chamber inserting portion") 23a is formed into which the coupling portion 132 is inserted when the terminal portion 131 of the bus bar 130 is accommodated in the common accommodating chamber 21C so as to accommodate the coupling portion 132 of the bus bar 130 in the common accommodating chamber 21C (FIGS. 4 to 8). The inter-chamber inserting portion 23a is a space which extends from the end portion on the inserting port 22 side of the partition wall 23 toward the inserting direction of the bus bar 130. For example, the inter-chamber inserting portion 23a is a slit-like notch portion which is notched from the end portion on the inserting port 22 side of the partition wall 23 toward the inserting direction of the bus bar 130, and the width between the wall surfaces is formed to be wider than the plate thickness of the coupling portion 132.

In addition, in the example terminal accommodating body 1 of this example, an accommodating chamber 30 for accommodating the electric wire connecting portion 133 of the bus bar 130 is provided (FIG. 3). Therefore, the inter-chamber inserting portion 23a is also provided in the partition wall 24 between the accommodating chamber 30 and the common accommodating chamber 21C adjacent to the accommodating chamber 30. For example, when power is supplied to the electronic component 210 side via the bus bar 130 as described above, the power supply terminal portion 133 of the bus bar 130 and the power supply terminal (the harness terminal connected to the electric wire 220 on the power supply side) described above are accommodated in the accommodating chamber 30, and the power supply terminal portion 133 and the power supply terminal are physically and electrically connected to each other in the chamber. In this case, the accommodating chamber 30 serves as a power supply terminal accommodating chamber.

Here, in the terminal accommodating body 1 of the present embodiment, a holding portion (hereinafter referred to as "terminal holding portion") 40 for holding the coupling terminal 120 accommodated in the terminal accommodating chamber 21 is provided (FIGS. 4 to 6 and 8). Further, in the terminal accommodating body 1, a holding portion (hereinafter referred to as "bus bar holding portion") 50 for holding the bus bar 130 accommodated in the common accommodating chamber 21C is provided (FIGS. 4 to 8).

The terminal holding portion 40 is provided for each terminal accommodating chamber 21. The terminal holding portion 40 is formed as a locking portion which protrudes in the terminal accommodating chamber 21 and locks a locked portion 123 of the coupling terminal 120 accommodated in the terminal accommodating chamber 21. In the locked portion 123 of this example, a side portion formed at the end portion (the end portion on the side opposite to the side on which the counterpart terminal is inserted) of the terminal connecting portion 121 is used (FIG. 2).

Figure 7:
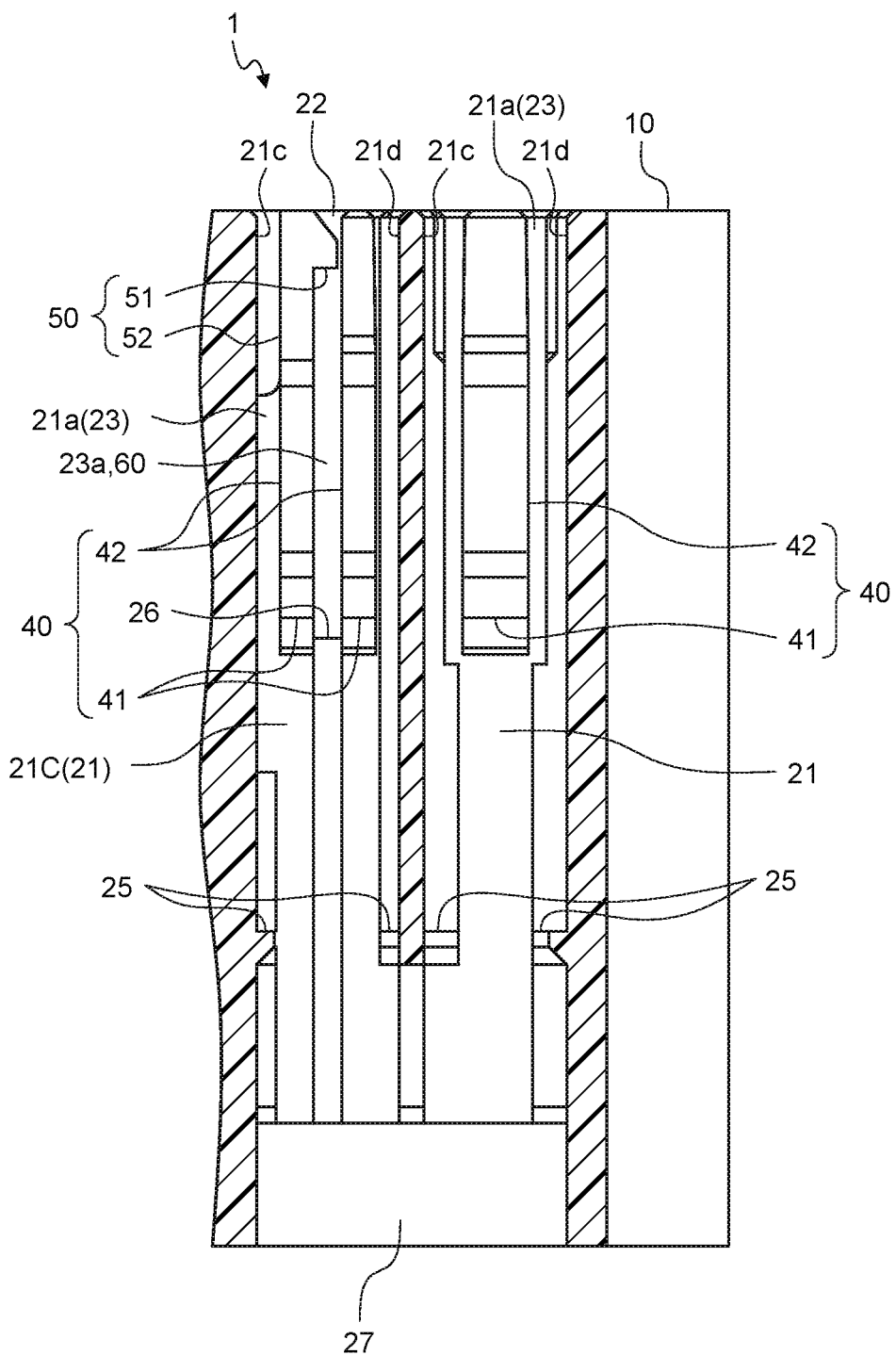
FIG. 7 is a cross-sectional view taken along the line X-X of FIG. 6.
Figure 8:
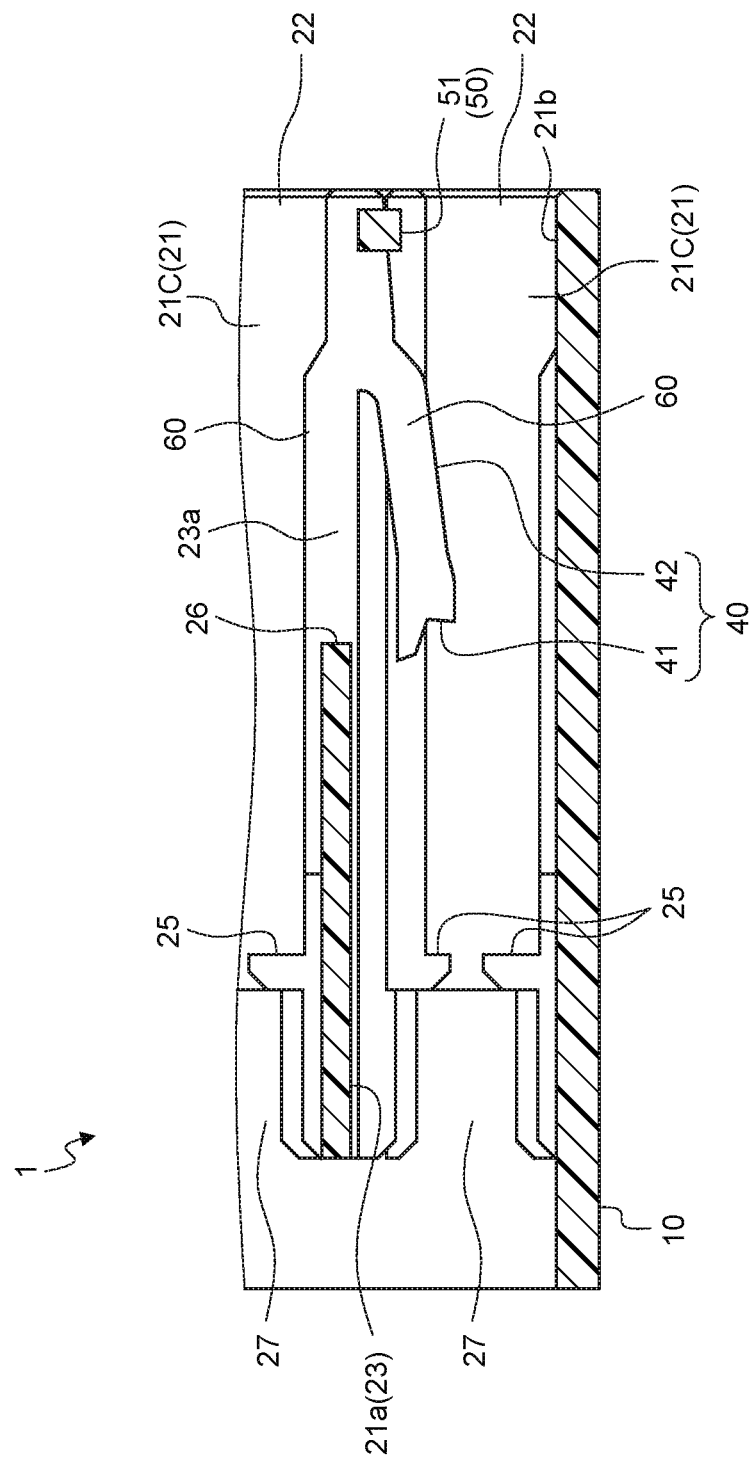
FIG. 8 is a cross-sectional view taken along the line Y-Y of FIG. 6.

The terminal holding portion 40 includes, for example, a claw portion 41 as a locking portion for locking the locked portion 123, and a support portion 42 which couples the claw portion 41 to an inner wall surface (hereinafter referred to as a "first inner wall surface") 21a of the terminal accommodating chamber 21 (FIGS. 7 and 8). Here, one of the two inner wall surfaces facing each other in the arrangement direction of the respective terminal accommodating chambers 21 of the first accommodating chamber group 20A and the second accommodating chamber group 20B serves as the first inner wall surface 21a.

The support portion 42 extends toward the inserting direction of the coupling terminal 120 to the terminal accommodating chamber 21 with the inserting port 22 side of the first inner wall surface 21a as a root. The support portion 42 has flexibility so that it can be tilted toward the first inner wall surface 21a side with its root as a fulcrum. The claw portion 41 is provided at the end portion in the extending direction of the support portion 42. The claw portion 41 protrudes toward the inner wall surface (hereinafter referred to as "second inner wall surface") 21b opposite to the first inner wall surface 21a. The terminal holding portion 40 is disposed between two inner wall surfaces (hereinafter referred to as "third and fourth inner wall surfaces") 21c and 21d (FIG. 6) opposite to each other in the terminal accommodating chamber 21 (that is, opposite in the arrangement direction of the above-mentioned paired terminal accommodating chambers 21). In this example, the terminal holding portion 40 is disposed substantially at the center between the two inner wall surfaces.

Figure 6:
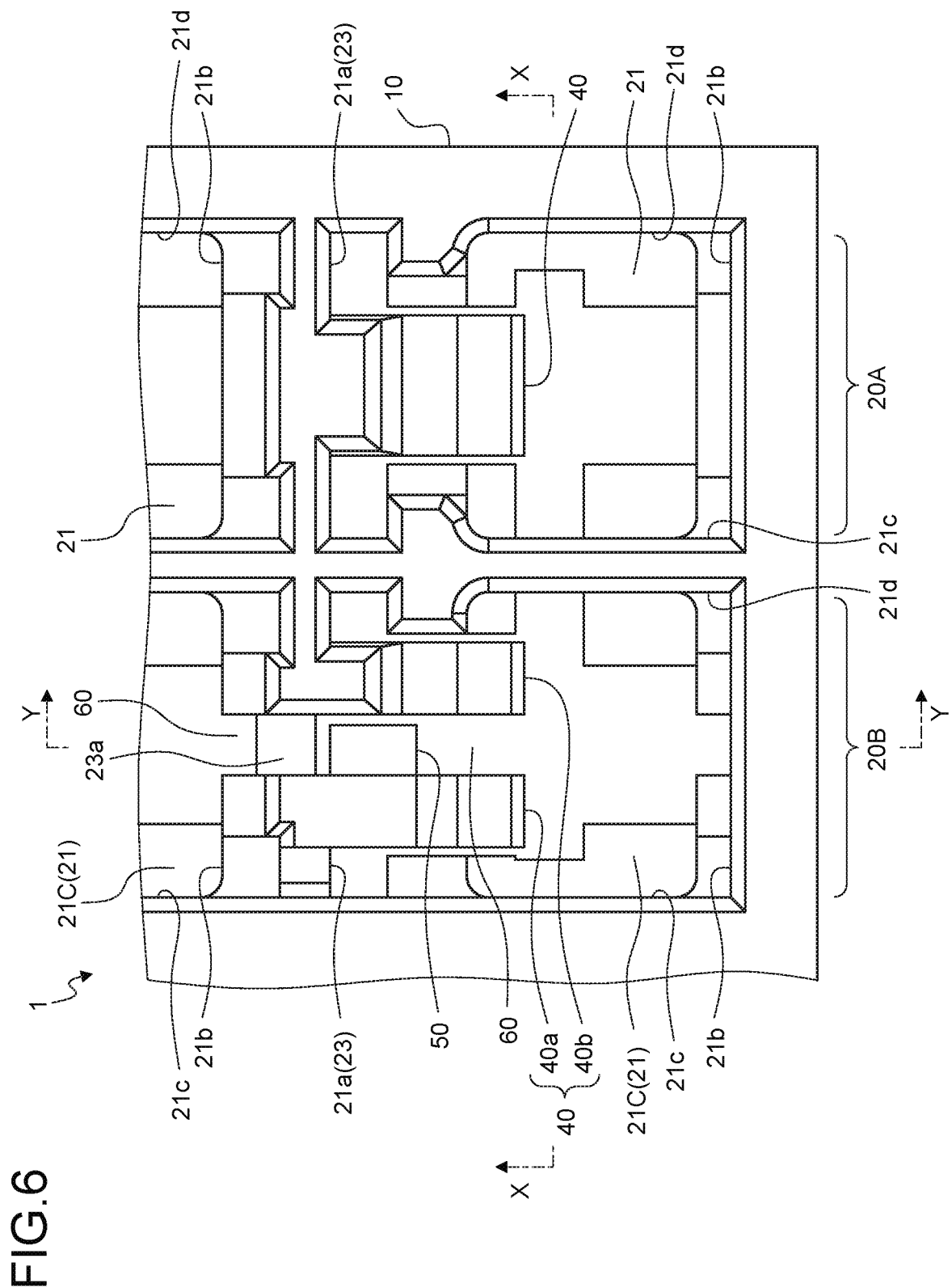
FIG. 6 is a partial enlarged view of the terminal accommodating chamber of FIG. 4.

In each of the terminal accommodating chambers 21 (each of common accommodating chambers 21C) of the second accommodating chamber group 20B, the terminal holding portion 40 is provided so as not to obstruct the accommodation of the bus bar 130 to the common accommodating chamber 21C and the inter-chamber inserting portion 23a. For example, in this example, the terminal holding portion 40 is disposed substantially at the center between the third and fourth inner wall surfaces 21c and 21d. In each terminal accommodating chamber 21 (each common accommodating chamber 21C) of the second accommodating chamber group 20B, the terminal portion 131 of the bus bar 130 and the coupling portion 132 are accommodated substantially at the center between the third and fourth inner wall surfaces 21c and 21d. For this reason, in this example, in the terminal holding portion 40, an inserting portion (hereinafter referred to as "interior inserting portion") 60 is formed into which at least one of the terminal portion 131 and the coupling portion 132 of the bus bar 130 is inserted when the terminal portion 131 is accommodated in the common accommodating chamber 21C (FIG. 6). The interior inserting portion 60 is a space which extends from the end portion on the inserting port 22 side of the terminal holding portion 40 (that is, the root of the support portion 42 of the terminal holding portion 40) toward the inserting direction of the bus bar 130. For example, the interior inserting portion 60 is a slit-like notch portion which is notched from the end portion on the inserting port 22 side of the terminal holding portion 40 toward the inserting direction of the bus bar 130, and the width between the wall surfaces is formed to be wider than the plate thickness of the terminal portion 131 or the coupling portion 132 of the bus bar 130. The interior inserting portion 60 of this example is disposed on the same plane as the inter-chamber inserting portion 23a and is connected to the inter-chamber inserting portion 23a. Further, the interior inserting portion 60 of this example extends to a position at which the terminal holding portion 40 is formed as two holding bodies 40a and 40b divided into two sections. Therefore, in the common accommodating chamber 21C, it is preferable to provide the terminal holding portion 40 capable of holding the coupling terminal 120, without obstructing the accommodation of the bus bar 130 to the common accommodating chamber 21C and the inter-chamber inserting portion 23a.

On the other hand, in the terminal accommodating chamber 21, the terminal holding portion 40 is disposed close to one of the third inner wall surface 21c and the fourth inner wall surface 21d, and it is also possible to provide a gap between the other thereof and the terminal holding portion 40. In the common accommodating chamber 21C of this case, by allowing the gap to exist at least on the same plane as the inter-chamber inserting portion 23a, this gap can be utilized as the interior inserting portion 60. Therefore, even in the common accommodating chamber 21C of this case, the terminal holding portion 40 can hold the coupling terminal 120, without obstructing the accommodation of the bus bar 130 to the common accommodating chamber 21C and the inter-chamber inserting portion 23a.

Figure 9:
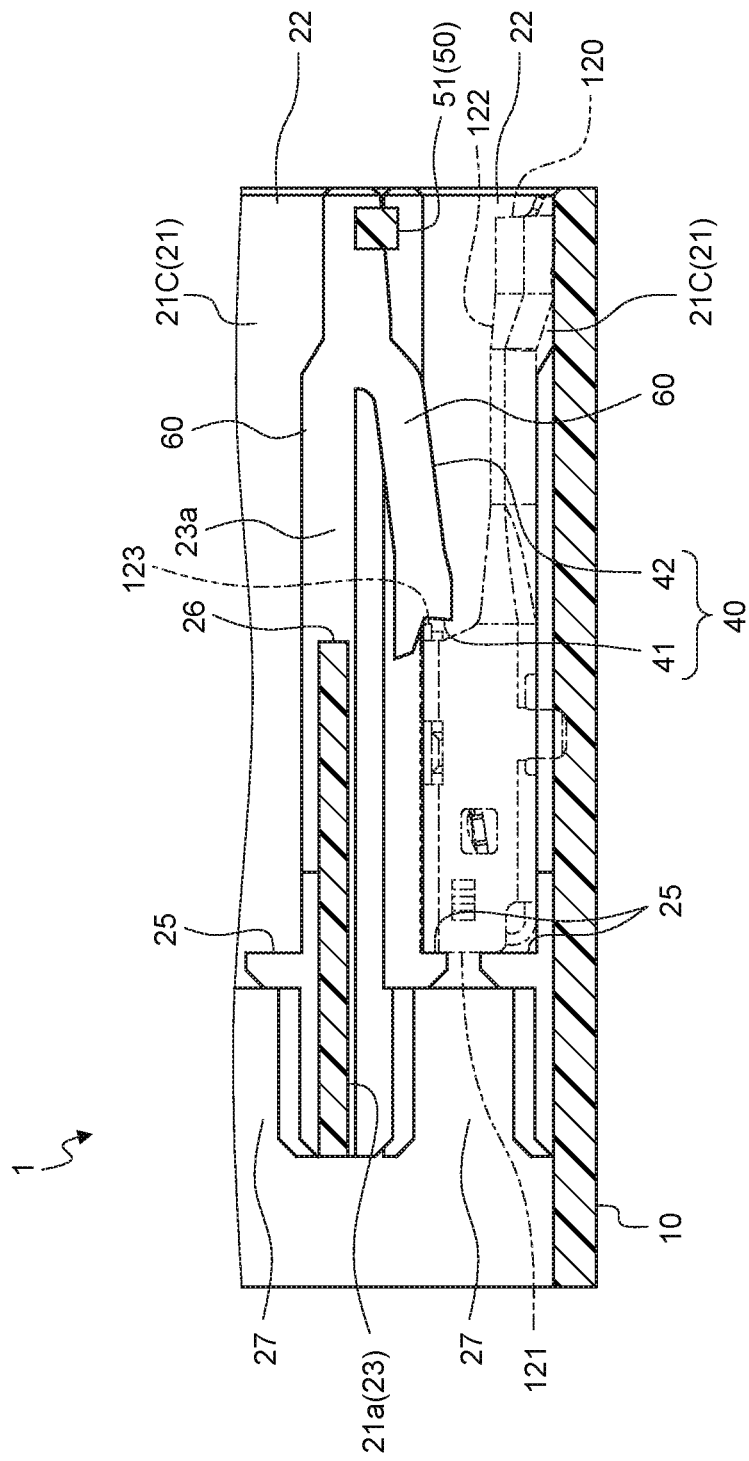
FIG. 9 is a diagram illustrating an accommodation state of the coupling terminal with respect to the common accommodating chamber of FIG. 8.

By forming the terminal holding portion 40 in this way, as the insertion of the coupling terminal 120 into the terminal accommodating chamber 21 progresses, the terminal connecting portion 121 applies a pressing force to the claw portion 41 of the terminal holding portion 40, and the support portion 42 can be tilted to the side (that is, the side of the first inner wall surface 21a) opposite to the side on which the claw portion 41 protrudes. In the terminal holding portion 40, when the locked portion 123 gets over the claw portion 41 together with insertion of the coupling terminal 120, the tilted state of the support portion 42 is eliminated, and the claw portion 41 and the support portion 42 return to an initial position (a position before the coupling terminal 120 is inserted). As a result, in the terminal accommodating chamber 21, the claw portion 41 locks the locked portion 123 so that the coupling terminal 120 moves in a drawing direction (that is, in the direction opposite to the inserting direction) and does not separate from the interior (FIG. 9). Further, the terminal accommodating chamber 21 is provided with a locking wall 25 which locks the coupling terminal 120 at a predetermined position so as not to excessively advance in the inserting direction (FIGS. 7 to 10). On the other hand, since the inter-chamber inserting portion 23a and the interior inserting portion 60 are formed in each terminal accommodating chamber 21 (each common accommodating chamber 21C) of the second accommodating chamber group 20B, the bus bars 130 can be accommodated instead of the coupling terminal 120.

Next, the bus bar holding portion 50 which holds the bus bar 130 will be described. The bus bar holding portion 50 is provided at least at two places with respect to the terminal accommodating body 1. For example, when the bus bar 130 is disposed over only a plurality of common accommodating chambers 21C, the bus bar holding portions 50 are provided in at least two places of the plurality of common accommodating chambers 21C. On the other hand, in the case where the bus bar 130 is also disposed over a space other than the common accommodating chamber 21C (such as the accommodating chamber 30 which accommodates the electric wire connecting portion 133 of the bus bar 130 in this example), the bus bar holding portion 50 may be provided in the space. A specific example of the bus bar holding portion 50 will be described below. Here, the bus bar holding portion 50 provided in the common accommodating chamber 21C (including the interior inserting portion 60) or the inter-chamber inserting portion 23a is taken as an example.

The bus bar holding portion 50 is provided to protrude from the wall surface existing inside the common accommodating chamber 21C or the wall surface of the inter-chamber inserting portion 23a. The wall surface existing inside the common accommodating chamber 21C refers to an inner wall surface (first to fourth inner wall surfaces 21a to 21d) constituting the common accommodating chamber 21C, and a wall surface (including the wall surface of the interior inserting portion 60) constituting the terminal holding portion 40 disposed in the common accommodating chamber 21C. The wall surface of the inter-chamber inserting portion 23a refers to the wall surface constituting the inter-chamber inserting portion 23a. The wall surface of the interior inserting portion 60 refers to the wall surface constituting the interior inserting portion 60. The bus bar holding portion 50 protrudes from any one of these wall surfaces, and is formed as a locking portion which locks the locked portion 134 of the bus bar 130, when the terminal portion 131 of the bus bar 130 is accommodated in the common accommodating chamber 21C. One end portion (end portion on the side opposite to the side on which the terminal portion 131 is provided) of the coupling portion 132 is used for locked portion 134 of this example (FIG. 3).

The bus bar holding portion 50 of this example has a claw portion 51 which locks the locked portion 134, and a support portion 52 which couples the claw portion 51 to any one of the wall surfaces (FIG. 7). For example, the bus bar holding portion 50 is provided on a wall portion having the first inner wall surface 21a provided with the terminal holding portion 40. The wall portion is a partition wall 23 between the adjacent common accommodating chambers 21C, or a partition wall 24 related to the accommodating chamber 30.

In the bus bar holding portion 50, the root of the support portion 52 is provided on the wall surfaces of the first inner wall surface 21a or the inter-chamber inserting portion 23a in the wall portion. The support portion 52 extends from the root in a direction opposite to the inserting direction of the bus bar 130 into the common accommodating chamber 21C. In this example, the root of the support portion 42 of the terminal holding portion 40 and the root of the support portion 52 of the bus bar holding portion 50 are disposed close to each other, and the respective support portions 42 and 52 extend in opposite directions from their respective roots (FIG. 7). The support portion 52 has flexibility so that it can be tilted with its root as a fulcrum. Here, as described above, a slit-like notch portion (interior inserting portion 60) arranged on the same plane as the inter-chamber inserting portion 23a is formed in the terminal holding portion 40 of the common accommodating chamber 21C. In this example, the inter-chamber inserting portion 23a and/or the interior inserting portion 60 also extend on the same plane on the side at which the support portion 52 of the bus bar holding portion 50 is disposed. On the extending side, one of the opposite wall surfaces of the inter-chamber inserting portion 23a and/or the interior inserting portion 60 also serves as the wall surface of the support portion 52. That is, the support portion 52 is provided on the third inner wall surface 21c side or the fourth inner wall surface 21d side, when viewed from the inter-chamber inserting portion 23a or the interior inserting portion 60.

The claw portion 51 is provided at the end portion of the support portion 52 in the extending direction. In the case where the support portion 52 is provided on the side of the third inner wall surface 21c described above, the claw portion 51 protrudes from the wall surface of the support portion 52 and from the wall surface on the third inner wall surface 21c side of the opposite wall surfaces in the inter-chamber inserting portion 23a or/and the interior inserting portion 60 toward the fourth inner wall surface 21d side. Further, in the case where the support portion 52 is provided on the side of the fourth inner wall surface 21d described above, the claw portion 51 protrudes from the wall surface of the support portion 52 and from the wall surface on the side of the fourth inner wall surface 21d of the opposite wall surfaces in the inter-chamber inserting portion 23a or/and the interior inserting portion 60 toward the third inner wall surface 21c side. Here, the former is exemplified.

In the terminal accommodating body 1, by disposing the bus bar holding portion 50 at such a position, since the bus bar holding portion 50 can be provided without promoting expansion of the common accommodating chamber 21C and without protruding from the common accommodating chamber 21C, it is possible to suppress an increase in size.

Here, as described above, in the common accommodating chamber 21C, in some cases, the terminal holding portion 40 is disposed close to one of the third inner wall surface 21c and the fourth inner wall surface 21d, and the interior inserting portion 60 is provided between the other thereof and the terminal holding portion 40. Even in this case, the bus bar holding portion 50 is provided to protrude from the common accommodating chamber 21C (also including the interior inserting portion 60) or the inter-chamber inserting portion 23a, and to protrude from the wall portion which forms any inner wall surface (at least one of the first to fourth inner wall surfaces 21a to 21d) of the common accommodating chamber 21C.

In each terminal accommodating chamber 21 (each common accommodating chamber 21C) of the second accommodating chamber group 20B, the bus bar holding portion 50 is provided so as not to obstruct the accommodation of the coupling terminal 120 into the common accommodating chamber 21C. For example, in this example, the bus bar holding portion 50 is arranged at a position deviated from the insertion locus of the coupling terminal 120 into the common accommodating chamber 21C.

Figure 10:
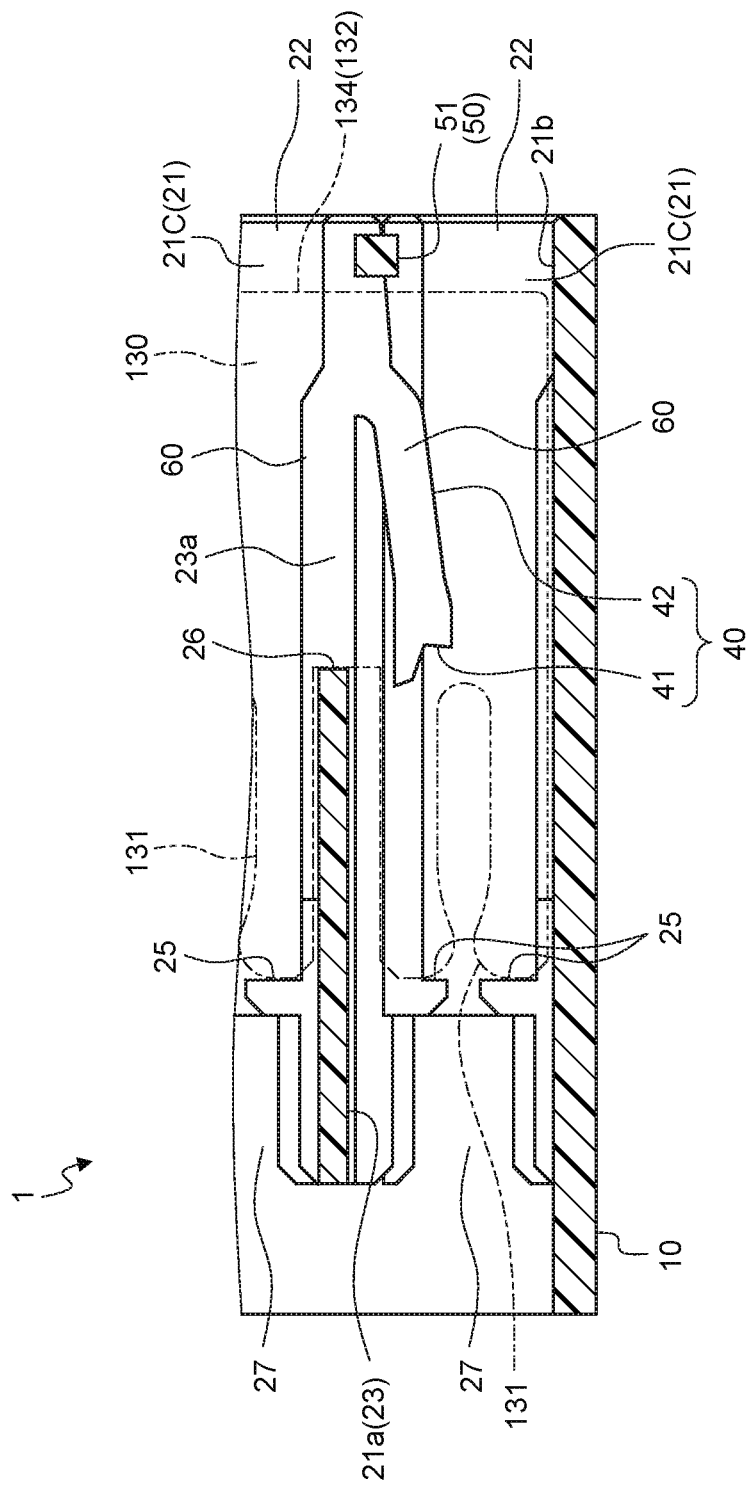
FIG. 10 is a diagram illustrating an accommodation state of a bus bar with respect to the common accommodating chamber of FIG. 8.

The bus bar 130 is inserted into each common accommodating chamber 21C (also including the interior inserting portion 60) of the second accommodating chamber group 20B and the inter-chamber inserting portion 23a from the inserting port 22 side, and as the insertion progresses, the terminal portion 131 or the coupling portion 132 applies a pressing force to the claw portion 51 of the bus bar holding portion 50 to tilt the support portion 52 to the side opposite to the protruding side of the claw portion 51. In the bus bar holding portion 50, when the coupling portion 132 gets over the claw portion 51 together with the insertion of the bus bar 130, the tilted state of the support portion 52 is eliminated, and the claw portion 51 and the support portion 52 return to the initial position (the position before the insertion of the bus bar 130). As a result, in each common accommodating chamber 21C, the claw portion 51 locks the locked portion 134 so that the bus bar 130 moves in the drawing direction (that is, in the direction opposite to the inserting direction) and does not separate from the chamber (FIG. 10). Further, in each common accommodating chamber 21C, a locking wall 26 which locks the bus bar 130 at a predetermined position so that the bus bar 130 does not excessively advance in the inserting direction is provided (FIGS. 7 to 10).

Here, in the terminal accommodating body 1, an electronic component accommodating chamber 27 for accommodating the electronic component 210 is provided (FIG. 1). For example, the electronic component accommodating chamber 27 is prepared for each electronic component 210 which is an accommodation target. The electronic component accommodating chamber 27 is made to communicate with the above-mentioned paired two terminal accommodating chambers 21, and specifically accommodates the electronic component main body 211. When the electronic component main body 211 is accommodated in the electronic component accommodating chamber 27, the electronic component 210 of this example accommodates the respective terminals 212 in the terminal accommodating chambers 21, respectively. At that time, one terminal 212 accommodated in the terminal accommodating chamber 21 of the first accommodating chamber group 20A is electrically connected to the coupling terminal 120, and the other terminal 212 accommodated in the common accommodating chamber 21C of the second accommodating chamber group 20B is electrically connected to the terminal 110 (the coupling terminal 120 or the terminal portion 131 of the bus bar 130).

As described above, since the terminal accommodating body 1 of the present embodiment is provided with the inter-chamber inserting portion 23a into which the bus bar 130 can be inserted, and the terminal holding portion 40 which holds the coupling terminal 120 without obstructing the accommodation of the bus bar 130, the terminal accommodating chamber 21 can be shared by the coupling terminal 120 and the bus bar 130. For this reason, for example, since the terminal accommodating body 1 can properly use the coupling terminal 120 and the bus bar 130 for each specification of the vehicle, common use can be provided between vehicles having different specifications. Therefore, since the terminal accommodating body 1 can simplify management relating to the assembling work of the terminal 110, the electronic component 210, and the like in the workplace, the cost can be reduced.

First Modified Example

Figure 11:
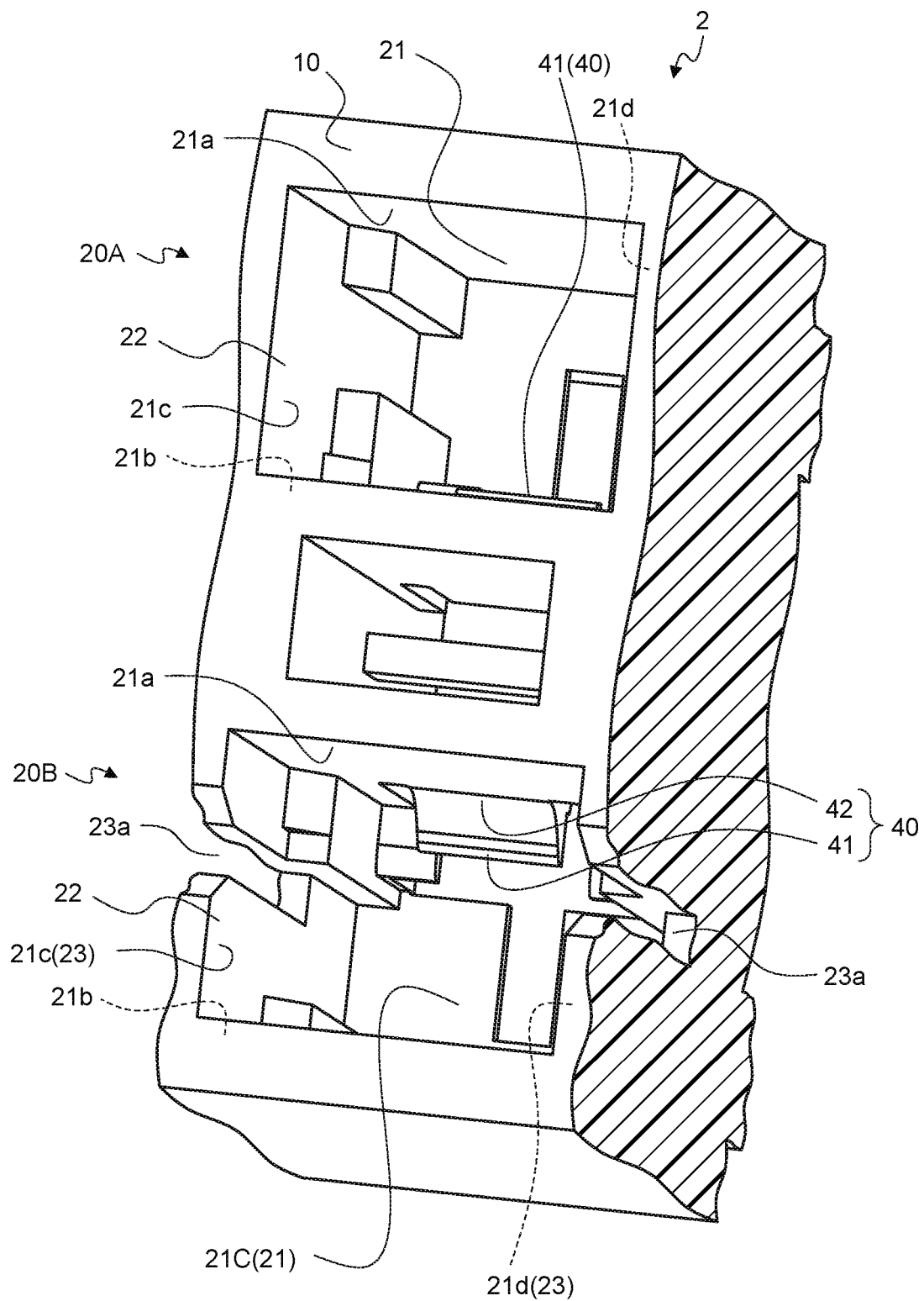
FIG. 11 is a perspective view illustrating a terminal accommodating body of a first modified example.

Reference numeral 2 of FIG. 11 denotes a terminal accommodating body of this modified example. As in the embodiment, the terminal accommodating body 2 can be configured as an electrical connecting box or a connecting body (a so-called block) interposed between the electronic component 210 (not illustrated in this modified example) and the electric wire 220 (not illustrated in this modified example). For example, when the terminal accommodating body 2 is configured as an electrical connecting box, it constitutes a wire harness WH (not illustrated in this modified example), together with the electrical connecting box, the terminal 110 (the coupling terminal 120 or the bus bar 130), the electronic component 210, and the electric wire 220.

In the terminal accommodating body 2, as in the terminal accommodating body 1 of the embodiment, at least a plurality of pairs of combinations of the rectangular terminal accommodating chamber 21 of the first accommodating chamber group 20A and the rectangular terminal accommodating chamber 21 of the second accommodating chamber group 20B (the common accommodating chamber 21C) is arranged. However, in the terminal accommodating body 2, unlike the terminal accommodating body 1 of the embodiment, along the direction in which the third inner wall surface 21c and the fourth inner wall surface 21d face each other, the plurality of terminal accommodating chambers 21 of the first accommodating chamber groups 20A and the plurality of terminal accommodating chambers 21 of the second accommodating chamber group 20B (common accommodating chambers 21C) are arranged in a line. Even in the terminal accommodating body 2, irrespective of whether the terminal 110 is the coupling terminal 120 or the terminal portion 131 of the bus bar 130, the terminal 110 is inserted into the terminal accommodating chamber 21 in the same direction via the common inserting port 22. In this drawing, only a pair of combinations of the terminal accommodating chambers 21 of the first accommodating chamber group 20A and the terminal accommodating chambers 21 of the second accommodating chamber group 20B (common accommodating chambers 21C) are extracted.

In each of the terminal accommodating chambers 21, the same terminal holding portion 40 as the embodiment is provided. The terminal holding portion 40 has a claw portion 41 protruding toward the second inner wall surface 21b, and a support portion 42 which couples the claw portion 41 to the first inner wall surface 21a, sets the inserting port 22 side of the wall portion having the first inner wall surface 21a as a root, and extends toward the inserting direction of the coupling terminal 120 into the terminal accommodating chamber 21. The terminal holding portion 40 is disposed between the third inner wall surface 21c and the fourth inner wall surface 21d (in this example, substantially the center therebetween).

In this modified example, a plurality of terminal accommodating chambers 21 (the common accommodating chamber 21C) of the second accommodating chamber group 20B is arranged along the direction in which the third inner wall surface 21c and the fourth inner wall surface 21d face each other, and the terminal portions 131 as each tuning fork terminal of the bus bar 130 are accommodated in the common accommodating chamber 21C. Therefore, in the terminal accommodating body 2, the wall portion having the third inner wall surface 21c and the fourth inner wall surface 21d serves as the partition wall 23 between the adjacent common accommodating chambers 21C, and the inter-chamber inserting portion 23a is formed in the partition wall 23. The inter-chamber inserting portion 23a is a space into which the coupling portion 132 of the bus bar 130 is inserted when the terminal portion 131 is accommodated in the common accommodating chamber 21C as in the embodiment, and the inter-chamber inserting portion 23a extends from the end portion on the inserting port 22 side of the partition wall 23 toward the inserting direction of the bus bar 130. The inter-chamber inserting portion 23a is, for example, a slit-like notch portion which is notched from the end portion on the inserting port 22 side of the partition wall 23 toward the inserting direction of the bus bar 130, and the width between the wall surfaces is formed to be wider than the plate thickness of the coupling portion 132.

The position at which the inter-chamber inserting portion 23a is formed is defined such that the terminal portion 131 is disposed between the terminal holding portion 40 and the second inner wall surface 21b in the common accommodating chamber 21C (that is, the accommodated terminal portion 131 is not brought into contact with the terminal holding portion 40). From another viewpoint, between the terminal holding portion 40 and the second inner wall surface 21b, an interior inserting portion is provided into which the bus bar 130 is inserted when the terminal portion 131 is accommodated in the common accommodating chamber 21C. Therefore, the terminal holding portion 40 of the common accommodating chamber 21C is disposed so as not to obstruct the accommodation of the bus bar 130 into the common accommodating chamber 21C and the inter-chamber inserting portion 23a.

Although not illustrated, the terminal accommodating body 2 also includes a second holding portion which holds the bus bar 130 in which the terminal portion 131 is accommodated in the common accommodating chamber 21C. The second holding portion has, for example, a claw portion and a support portion equivalent to those of the embodiment, and is provided at least two places of the plurality of common accommodating chambers 21C so as not to obstruct the accommodation of the coupling terminal 120 to the common accommodating chamber 21C. The second holding portion is disposed at a position deviated from the insertion locus of the coupling terminal 120 into the common accommodating chamber 21C. For example, the second holding portion protrudes from the third inner wall surface 21c, the fourth inner wall surface 21d, the wall surface of the inter-chamber inserting portion 23a, or the like.

Figure 12:
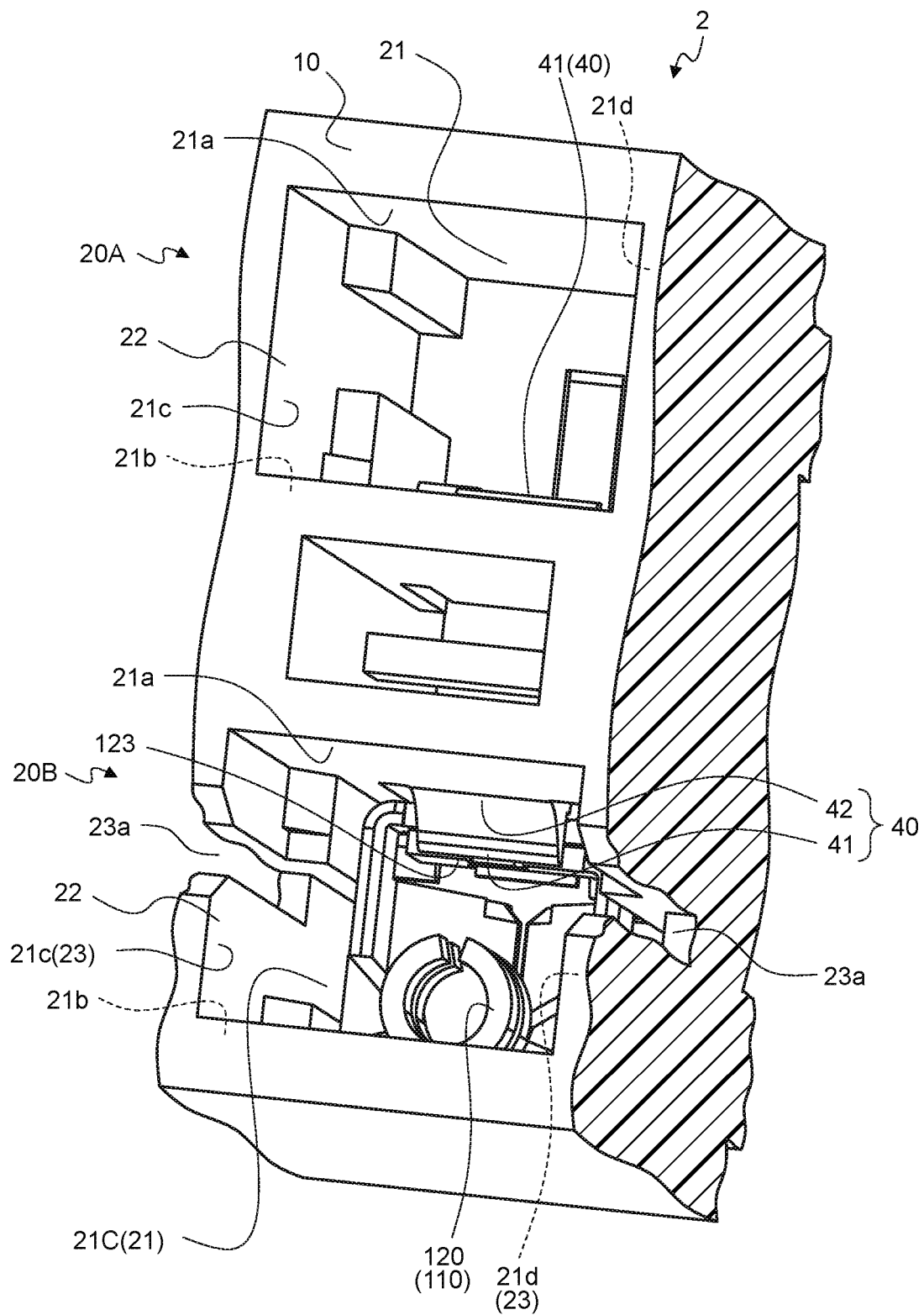
FIG. 12 is a diagram illustrating an accommodation state of the coupling terminal with respect to the common accommodating chamber of FIG. 11.
Figure 13:
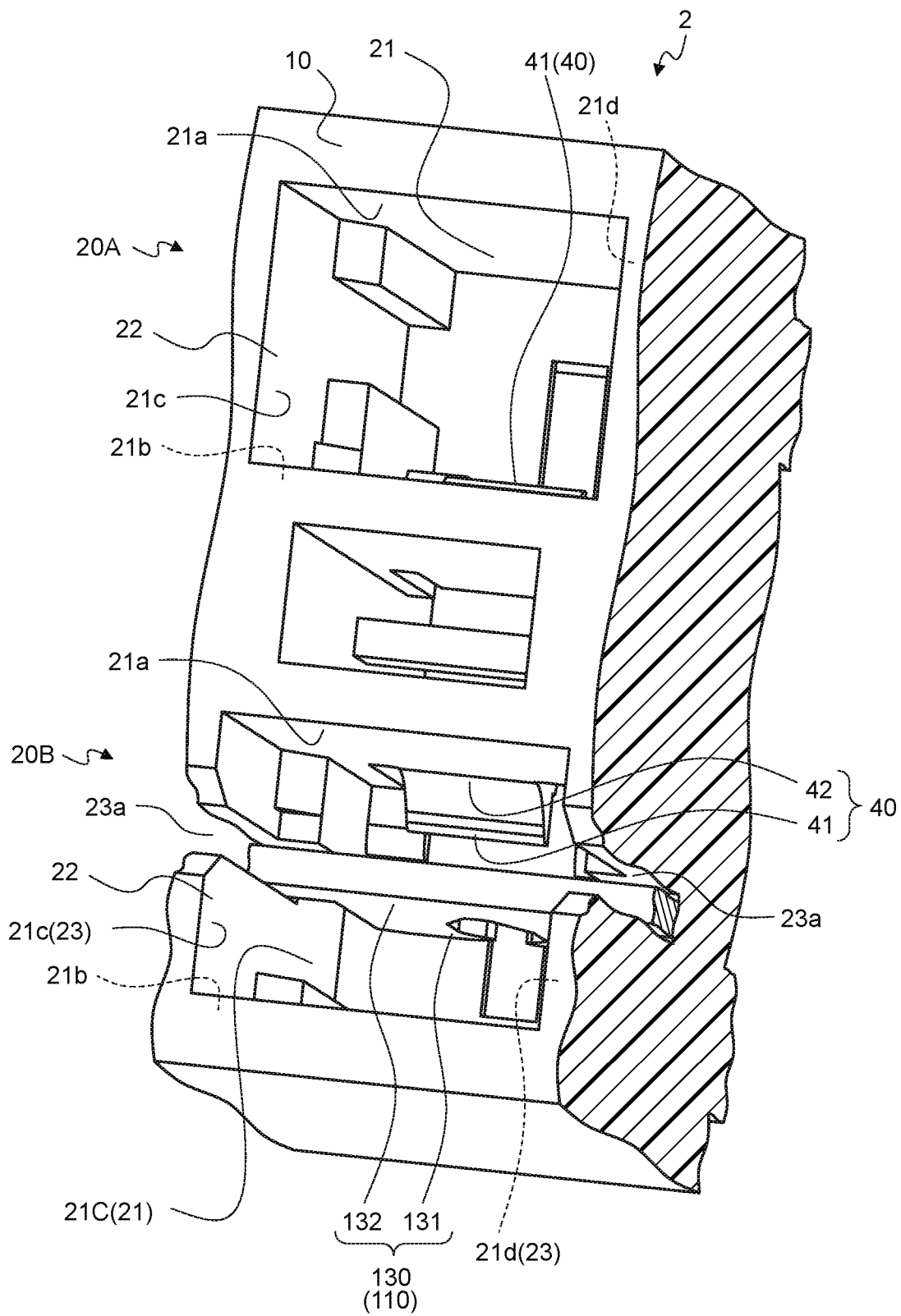
FIG. 13 is a diagram illustrating an accommodation state of the bus bar with respect to the common accommodating chamber of FIG. 11.
Figure 14:
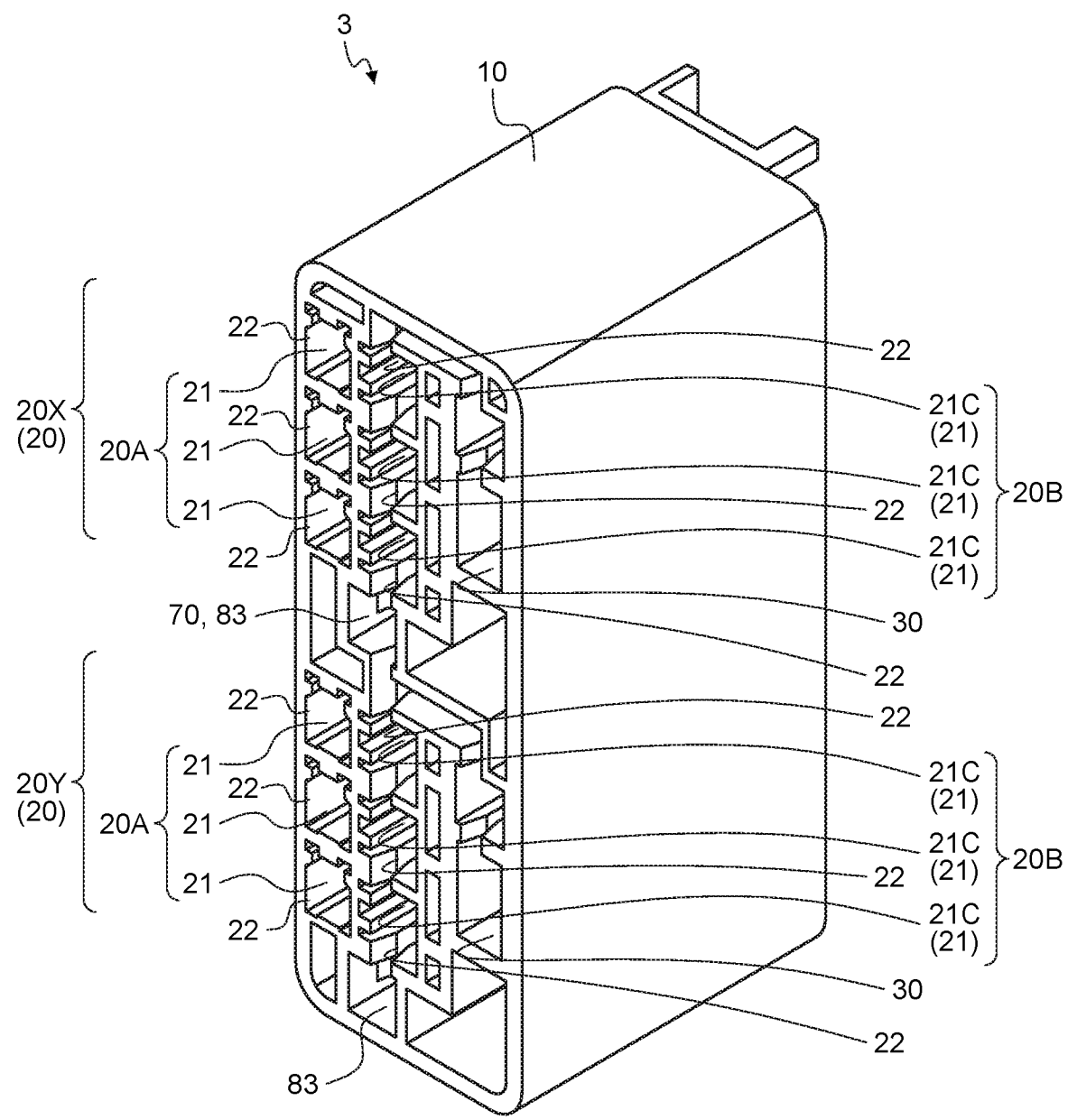
FIG. 14 is a perspective view illustrating a terminal accommodating body of a second modified example.

By shaping in this way, in the terminal accommodating body 2, since the terminal accommodating chamber 21 can be shared by the coupling terminal 120 and the bus bar 130, the coupling terminal 120 and the terminal portion 131 of the bus bar 130 can be suitably replaced, accommodated and held, with respect to the shared common accommodating chamber 21C. For example, the terminal accommodating body 2 can electrically connect the plate-like terminal 212 of the electronic component 210, when the coupling terminal 120 is accommodated to the common accommodating chamber 21C (FIG. 12), and the terminal accommodating body 2 can electrically connect the plate-like terminal 212 of the electronic component 210, when the terminal portion 131 of the bus bar 130 is accommodated to the common accommodating chamber 21C (FIG. 13). Therefore, the terminal accommodating body 2 can obtain the same effect as the terminal accommodating body 1 of the embodiment. Further, since the wire harness WH of this modified example includes the terminal accommodating body 2, the effect of the terminal accommodating body 2 can be exerted.

Second Modified Example

Reference numeral 3 of FIGS. 14 to 19 denotes a terminal accommodating body of this modified example. As in the embodiment and first modified example, the terminal accommodating body 3 can be configured as an electrical connecting box or, for example, a connecting body (a so-called block) interposed between the electronic component 210 and the electric wire 220 (illustrated in a circuit configuration diagram to be described later). As in the embodiment and the first modified example, the terminal accommodating body 3 can constitute a wire harness WH (not illustrated in the present modified example) together with the accommodated terminals 110 and the like, when configured as an electrical connecting box. Further, in this modified example, for the sake of convenience of explanation, even if there are differences in shape, quantity, arrangement, or the like as compared to the embodiment or the first modified example, as long as their essential functions are the same, they are denoted by the same reference numerals as in the embodiment and the first modified example.

Here, the terminal accommodating body 1 of the embodiment and the terminal accommodating body 2 of the first modified example include the plurality of terminal accommodating chambers 21 for establishing an electrical connection relation between the terminal 212 of the electronic component 210 and the terminal 110 (the coupling terminal 120 or the bus bar 130), and some of the terminal accommodating chambers 21 are formed to serve as the common accommodating chamber 21C (a room capable of replacing and accommodating the coupling terminal 120 and the terminal portion 131 of the bus bar 130 as appropriate). In other words, the terminal accommodating body 1 of the embodiment and the terminal accommodating body 2 of the first modified example are all spaces including the terminal accommodating chambers 21 owned by the terminal accommodating body 1 and the terminal accommodating body 2, and includes one space (hereafter referred to as "electrical connecting space") which can appropriately change the electrical connection relation between with the terminal 212 of the electronic component 210 and the terminal 110 (the coupling terminal 120 or the bus bar 130). In the electrical connecting space, for example, in the case where the terminals 212 of the electronic component 210 are accommodated in the respective terminal accommodating chambers 21 one by one, by inserting the coupling terminal 120 into the terminal accommodating chamber 21, one terminal 212 and the one coupling terminal 120 can be electrically connected to each other as a pair of combinations. In this case, in the electrical connecting space, by inserting the terminal portions 131 of one bus bar 130 into the plurality of terminal accommodating chambers 21 one by one, the terminals 212 of the plurality of terminal accommodating chambers 21 can be electrically connected to each other by the bus bar 130, or it is possible to supply power to the terminals 212 of the plurality of terminal accommodating chambers 21 with the bus bar 130.

Even in this modified example, the terminal accommodating body 3 is provided with a space that can appropriately change the same electrical connection relation as that of such embodiment and first modified example. However, in the terminal accommodating body 3 of this modified example, the space is constituted by a plurality of electrical connecting spaces 20, and a plurality of electrical connecting spaces 20 is arranged side by side. For example, in the terminal accommodating body 3, a plurality of electrical connecting spaces 20 may be arranged in series, a plurality of electrical connecting spaces 20 may be arranged in an L shape, or a plurality of electrical connecting spaces 20 may be arranged in a lattice pattern. In addition, in the terminal accommodating body 3, only a plurality of electrical connecting spaces 20 having the same configuration may be arranged, or a plurality of types of electrical connecting spaces 20 may be arranged in a mixed state. The electrical connecting space 20 having the same configuration means that a plurality of terminal accommodating chambers 21 of the same combination is provided in the same arrangement in each of the electrical connecting spaces 20. Further, the plurality of types of electrical connecting spaces 20 means that, for example, in different arrangements in each electrical connecting space 20, a plurality of terminal accommodating chambers 21 of the same combination is provided, and a plurality of terminal accommodating chambers 21 of different combinations is constituted.

Figure 17:
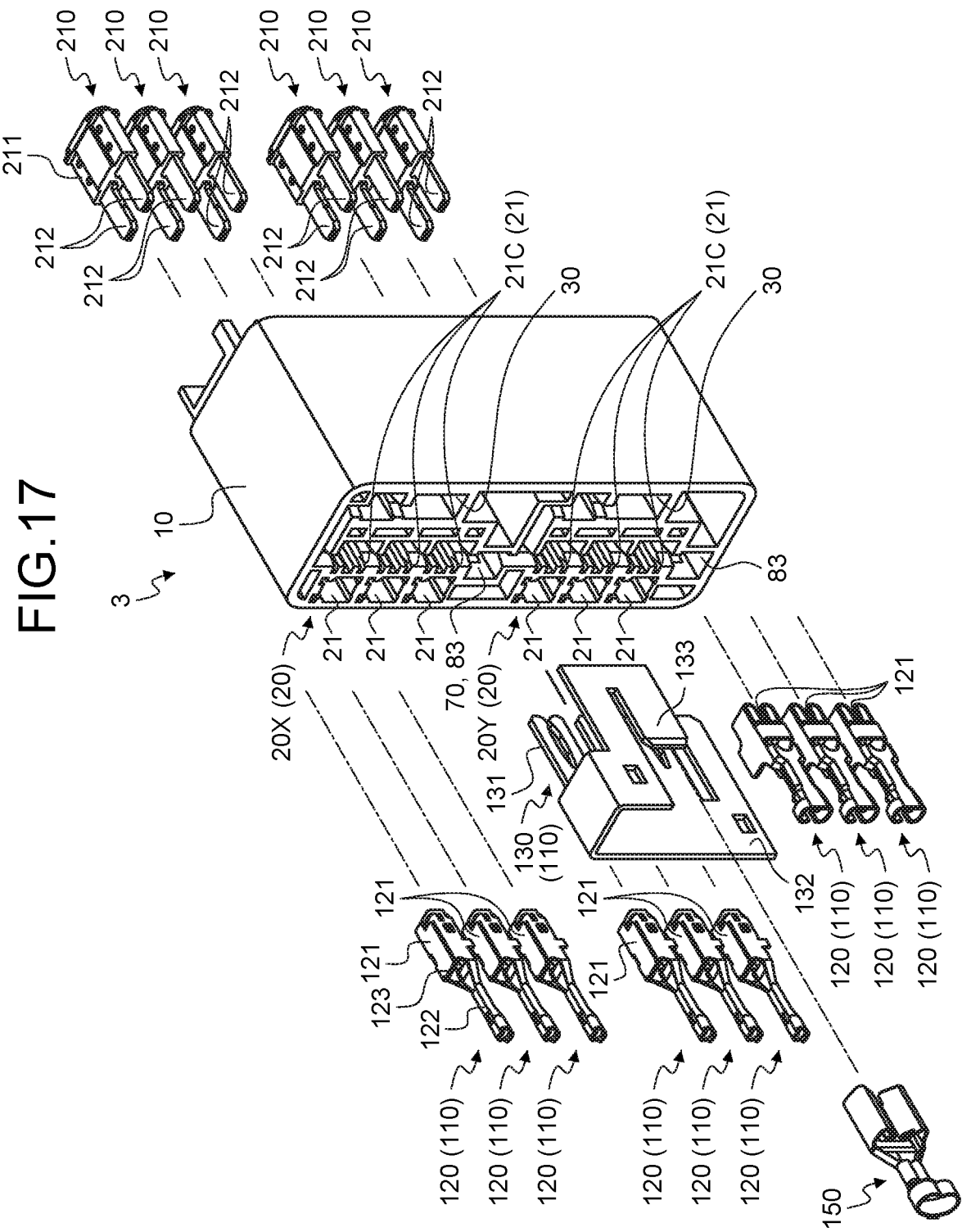
FIG. 17 is an exploded perspective view illustrating one usage example of the terminal accommodating body of the second modified example.
Figure 18:
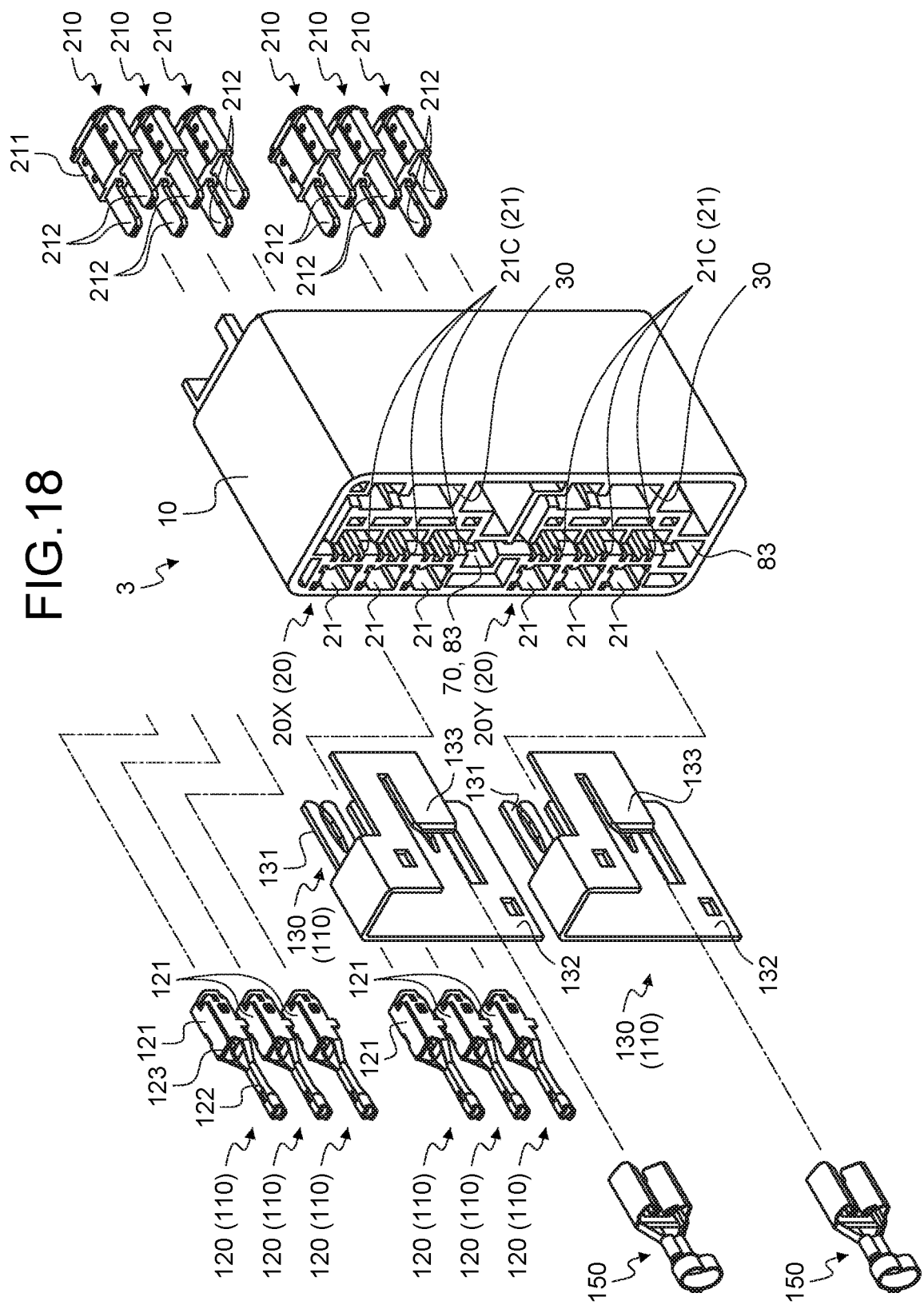
FIG. 18 is an exploded perspective view illustrating one usage example of the terminal accommodating body of the second modified example.

For example, the terminal accommodating body 3 is disposed by arranging a plurality of electrical connecting spaces in the terminal accommodating body 1 of the embodiment or a plurality of electrical connecting spaces in the terminal accommodating body 2 of the first modified example. Therefore, in each electrical connecting space 20, the terminal accommodating body 3 can perform the electric connection between the terminal 212 of the electronic component 210 and the coupling terminal 120 (FIGS. 15 to 19), the electrical connection between the terminals 212 of the plurality of electronic components 210 (FIGS. 17 and 18), and power supply to the terminals 212 of the plurality of electronic components 210 (FIGS. 17 and 18).

Figure 19:
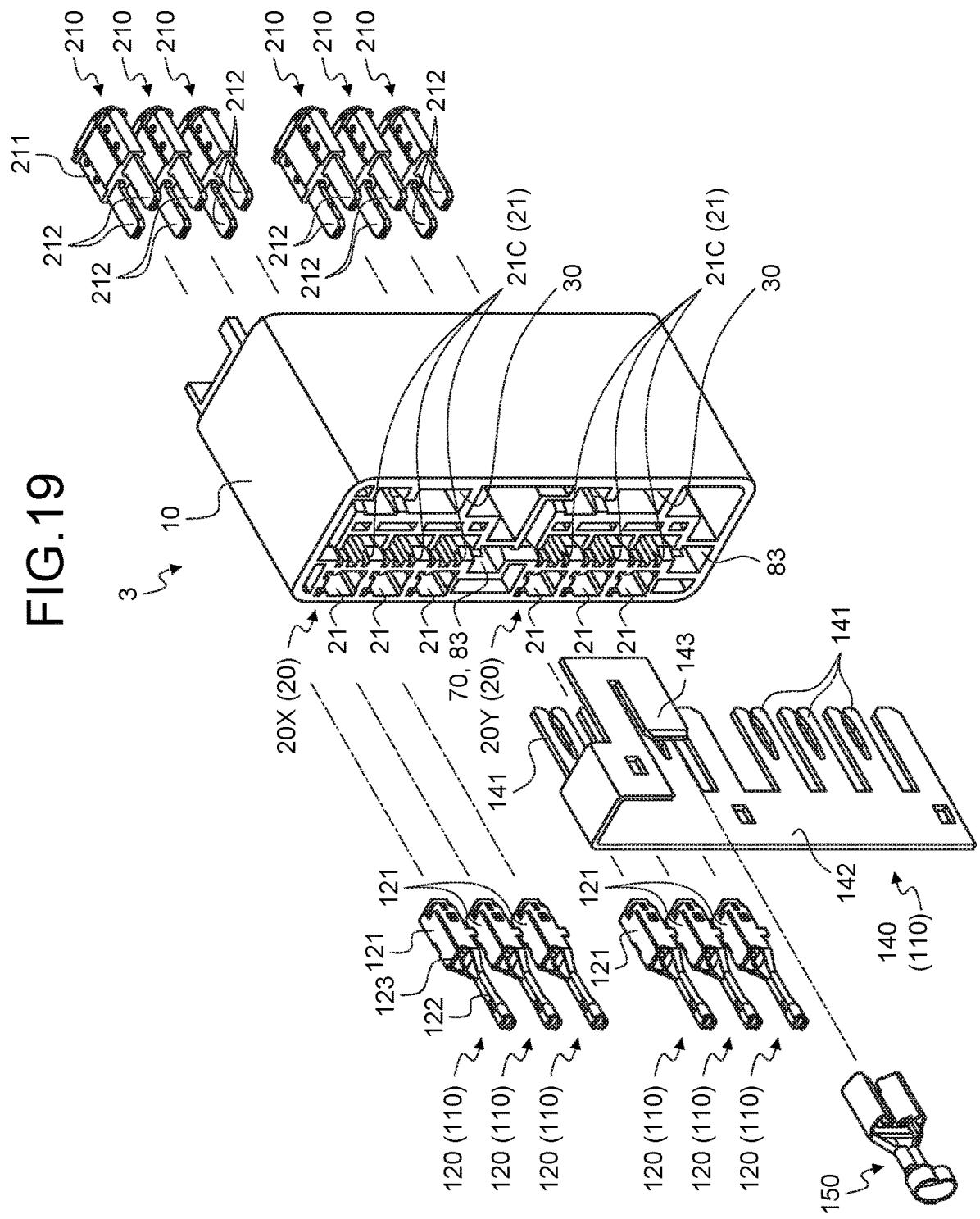
FIG. 19 is an exploded perspective view illustrating one usage example of the terminal accommodating body of the second modified example.

In addition to the same electrical connection relation as those in such embodiment and first modified example, the terminal accommodating body 3 is configured to be able to electrically connect the terminals 212 of the plurality of electronic components 210 accommodated in at least two electrical connecting spaces 20 adjacent to each other among the plurality of electrical connecting spaces 20 by one bus bar (hereinafter referred to as "junction bus bar") 140 or to be able to supply power to one of the terminals 212 of the plurality of electronic components 210 accommodated in at least two electrical connecting spaces 20 adjacent to each other by one junction bus bar 140 (FIG. 19). The junction bus bar 140 is a member for electrically connecting and supplying power between at least two terminal accommodating chambers 21 adjacent to each other in the plurality of electrical connecting spaces 20, and is an example of the terminal 110 illustrated above. The terminal accommodating body 3 is formed to accommodate one plate-like junction bus bar 140 across at least two adjacent electrical connecting spaces 20.

Figure 21:
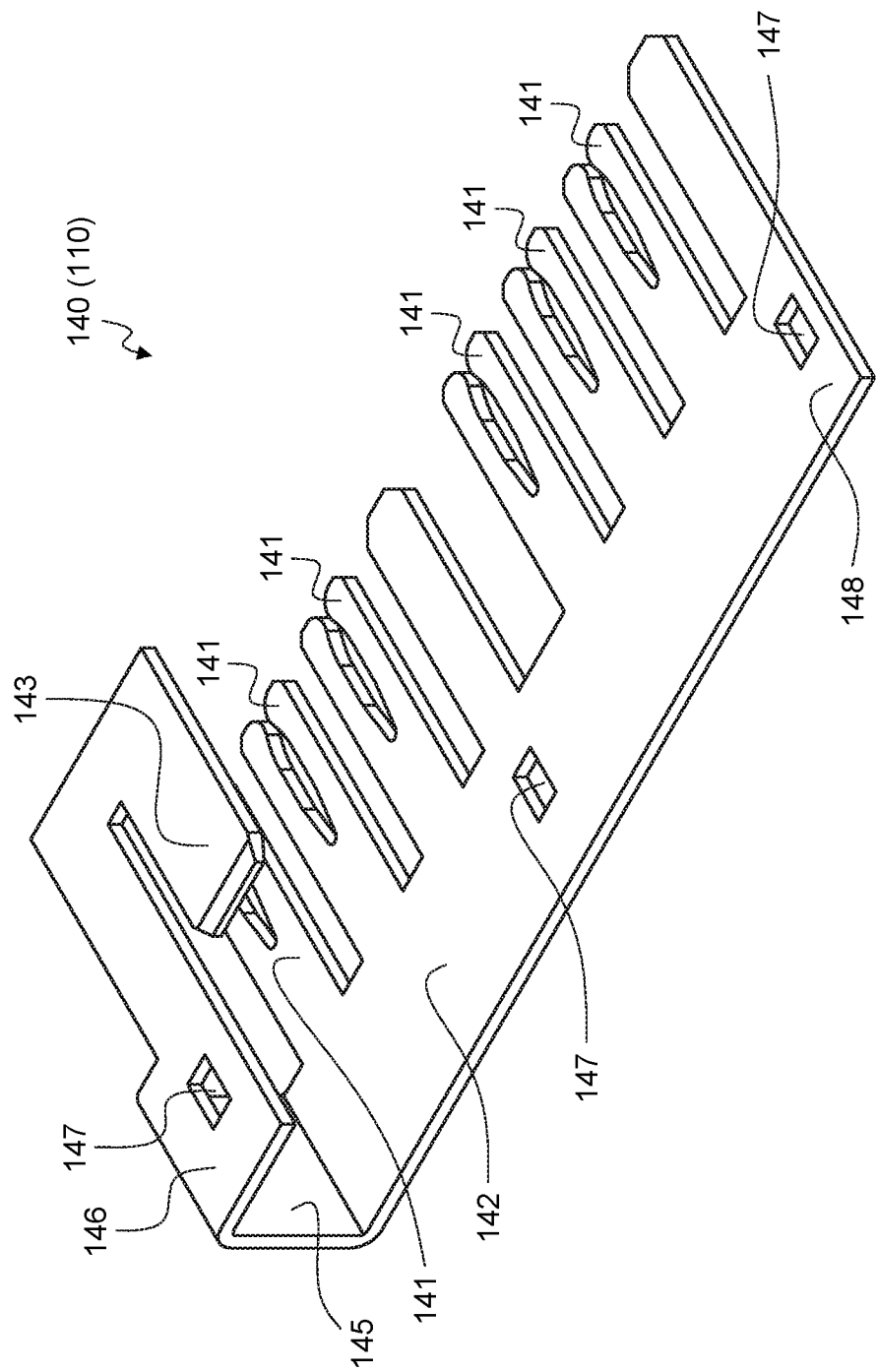
FIG. 21 is a perspective view illustrating a junction bus bar according to the second modified example.

Here, the junction bus bar 140 is, for example, a plate-like element formed, using a conductive metal plate material (for example, a copper plate) as a base material, and can electrically connect a plurality of counterpart terminals (terminals 212 of the electronic component 210). The junction bus bar 140 has a terminal portion 141 and a coupling portion 142 (FIGS. 19 and 21). The terminal portion 141 is a portion that enables electrical connection to the counterpart terminal, and a plurality of terminal portions 141 is provided in accordance with the number of counterpart terminals to be connected. The coupling portion 142 is a portion that couples the plurality of terminal portions 141, and connects the adjacent terminal portions 141 to each other. Like the bus bar 130, the terminal portion 141 of this example is formed as a plate-like tuning fork terminal in accordance with a male counterpart terminal (terminal 212). Each of the terminal portions 141 is arranged in a line on the same plane at an interval so as to make the connection directions with each counterpart terminal match with each other. The coupling portion 142 of this example is a rectangular plate-like portion which connects the roots of the respective terminal portions 141 (end portions on the side opposite to the side on which the counterpart terminal is inserted) on the same plane.

In the terminal accommodating body 3 of this modified example, in each common accommodating chamber 21C of the two adjacent electrical connecting spaces 20, at least one common accommodating chamber 21C in one electrical connecting space 20 and at least one common accommodating chamber 21C in the other electrical connecting space 20 are defined as junction accommodating chambers, respectively. The junction accommodating chambers are common accommodating chambers 21C connected to each other in a communication state between the plurality of electrical connecting spaces 20, and the terminal portions 141 of the junction bus bar 140 are accommodated in the common accommodating chambers 21C. Each junction accommodating chamber is formed so that the coupling terminal 120, one terminal portion 131 of the bus bar 130, and one terminal portion 141 of the junction bus bar 140 can be replaced and accommodated.

The terminal accommodating body 3 is formed such that, in each junction accommodating space of the two electrical connecting spaces 20 adjacent to each other, the adjacent space of the junction accommodating chamber between the junction accommodating chamber of one electrical connecting space 20 and the junction accommodating chamber of the other electrical connecting space 20 are made to communicate with each other, and the junction bus bars 140 can be accommodated between the adjacent junction accommodating chambers. For this purpose, the terminal accommodating body 3 is provided with an inter-chamber communicating portion 70 between the adjacent junction accommodating chambers which allows the chambers between respective junction accommodating chambers to communicate with each other and accommodates a part of the coupling portion 142 of the junction bus bar 140 (FIGS. 14 to 19). The inter-chamber communicating portion 70 allows the spaces between the junction accommodating chambers adjacent to each other between the adjacent electrical connecting spaces 20 to communicate with each other. As long as it is possible accommodate the coupling portion 142 of the junction bus bar 140, the inter-chamber communicating portion may be formed in any shape. For example, the inter-chamber communicating portion 70 is formed to accommodate the coupling portion 142 together with the terminal portion 141 in the junction accommodating chamber, and is formed so that the junction bus bar 140 is disposed inside the terminal accommodating body 3.

Specifically, in the terminal accommodating body 3 of this example, two electrical connecting spaces 20 having the same configuration are arranged side by side (FIGS. 14 to 19). Here, in some cases, one of the two electrical connecting spaces 20 is referred to as a first electrical connecting space 20X, and the other thereof is referred to as a second electrical connecting space 20Y. In the first electrical connecting space 20X and the second electrical connecting space 20Y, three terminal accommodating chambers 21 forming the first accommodating chamber group 20A, and three terminal accommodating chambers 21 (the common accommodating chamber 21C) forming the second accommodating chamber group 20B are arranged in parallel (FIGS. 14 and 15), respectively. In this example, all three terminal accommodating chambers 21 (the common accommodating chambers 21C) of the second accommodating chamber group 20B are used as a junction accommodating chamber. Therefore, for the sake of convenience, the junction accommodating chamber of this example is denoted by the same reference numeral "21C" as that of the common accommodating chamber 21C.

Figure 15:
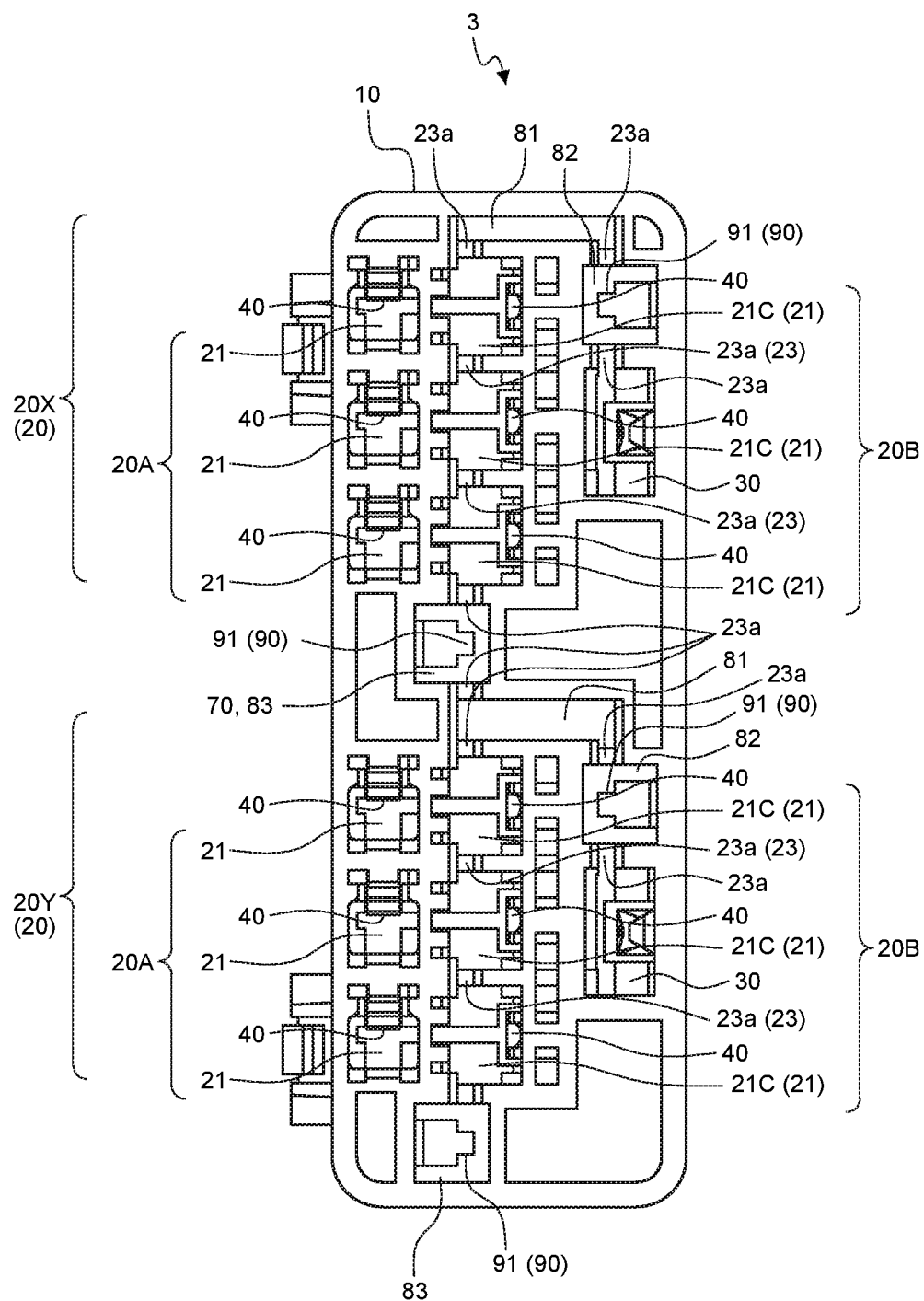
FIG. 15 is a front view of a terminal accommodating body of the second modified example as seen from the inserting port side of the terminal.

In each of the terminal accommodating chambers 21, as in the embodiment and the first modified example, the terminal holding portion 40 for holding the coupling terminal 120 in the chamber is provided (FIG. 15). However, in the terminal accommodating chamber 21 of the second accommodating chamber group 20B of this modified example, unlike the embodiment and the first modified example, a slit-like notch portion (interior inserting portion 60) is not provided in the terminal holding portion 40.

In each of the electrical connecting spaces 20, as illustrated in the embodiment or the first modified example, the inter-chamber inserting portion 23a is formed in the partition wall 23 between the adjacent junction accommodating chambers 21C (FIG. 15). The coupling portion 132 is inserted into the inter-chamber inserting portion 23a in a state in which the terminal portion 131 (FIGS. 17, 18, and 20) of the bus bar 130 is accommodated in the common accommodating chamber (the junction accommodating chamber) 21C. The coupling portion 142 can also be inserted into the inter-chamber inserting portion 23a, in a state in which the terminal portion 141 (FIG. 19 and FIG. 21) of the junction bus bar 140 is accommodated in the common accommodating chamber (the junction accommodating chamber) 21C. Further, the bus bar 130 has three terminal portions 131 corresponding to the three common accommodating chambers (junction accommodating chambers) 21C of the first electrical connecting space 20X. Further, the junction bus bar 140 has six terminal portion 141 corresponding to the three common accommodating chambers (the junction accommodating chambers) 21C of the first electrical connecting space 20X and the three common accommodating chambers (the junction accommodating chambers) 21C of the second electrical connecting space 20Y.

Figure 20:
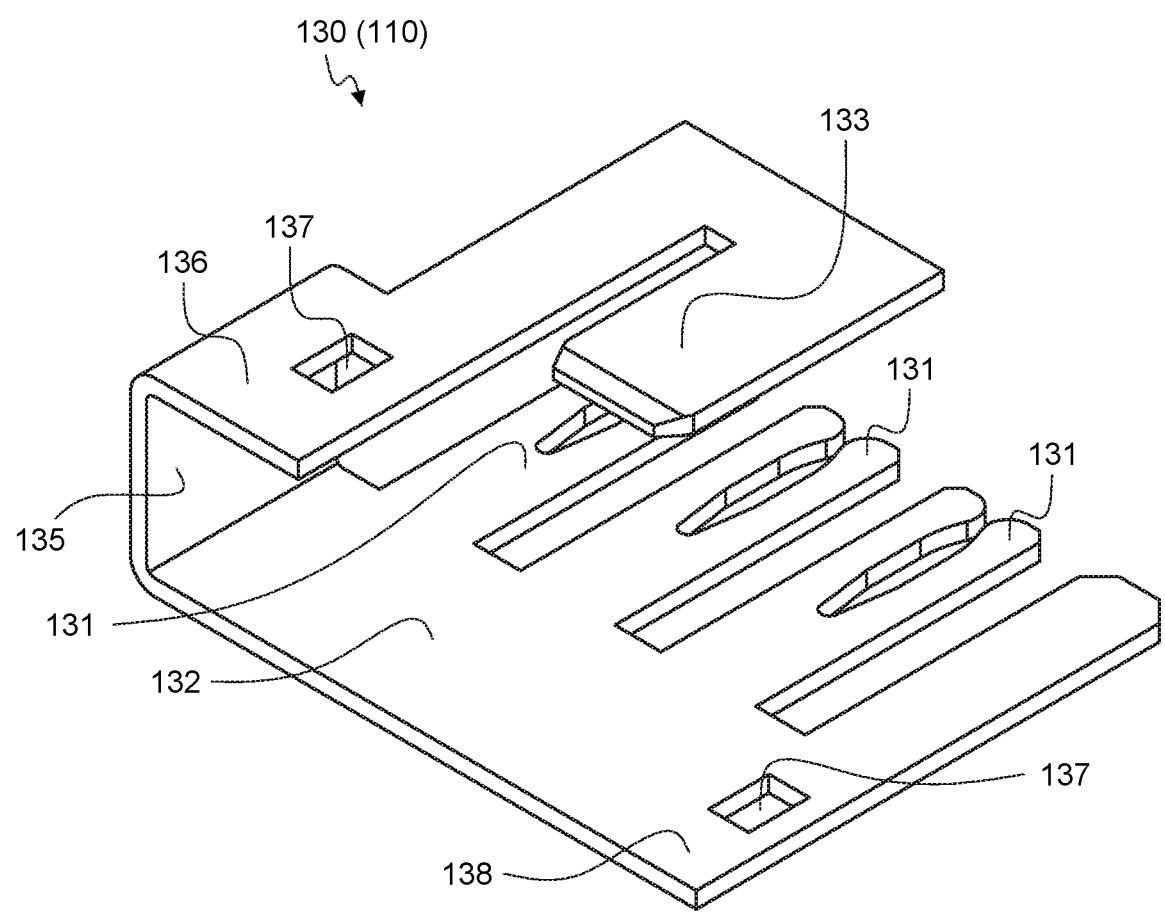
FIG. 20 is a perspective view illustrating a bus bar according to the second modified example.

Here, even in this modified example, the bus bar 130 has an electric wire connecting portion 133 similar to that of the embodiment and first modified example (FIGS. 17, 18, and 20). However, in the bus bar 130 of the present modified example, the terminal portion 131, the coupling portion 132 and the electric wire connecting portion 133 are disposed in parallel with the planes spaced apart from each other, and a first joining portion 135 for connecting the coupling portion 132 to the electric wire connecting portion 133 side, and a second joining portion 136 for connecting the first joining portion 135 to the electric wire connecting portion 133 are provided (FIG. 20). The first joining portion 135 is disposed in an orthogonal state with respect to the respective planes of the coupling portion 132 and the electric wire connecting portion 133. The second joining portion 136 is disposed on the same plane as the electric wire connecting portion 133. In this bus bar 130, the end portion of the coupling portion 132 and the end portion of the second joining portion 136 (the end portion on the opposite to the arrangement of the electric wire connecting portion 133) are connected by the first joining portion 135.

Further, as in the bus bar 130, the junction bus bar 140 of this example has a plate-like portion disposed to be spaced apart from the terminal portion 141 and the coupling portion 142 on the same plane, and is used as an electric wire connecting portion 143 for electrically connecting the plate-like portion to the electric wire 220 (FIGS. 19 and 21). The terminal portion 141, the coupling portion 142, and the electric wire connecting portion 143 are arranged so that their planes are parallel to each other. The electric wire connecting portion 143 may be, for example, a terminal portion electrically connected to a harness terminal (different from the coupling terminal 120) of the electric wire 220, and the electric wire connecting portion 143 and the electric wire 220 may be electrically connected to each other, by welding the end portion of the electric wire 220. In this example, the electric wire connecting portion 143 as a terminal portion is provided, and a harness terminal of the electric wire 220 is fitted. For example, when power is supplied to the electronic component 210 side of each electrical connecting space 20 via the junction bus bar 140, the electric wire connecting portion 143 of the junction bus bar 140 serves as a power supply terminal portion 143, and the power supply terminal portion 143 is electrically connected to the power supply side.

Furthermore, the junction bus bar 140 further includes a first joining portion 145 which connects the coupling portion 142 to the electric wire connecting portion 143 side, and a second joining portion 146 which connects the first joining portion 145 to the electric wire connecting portion 143 (FIG. 21). The first joining portion 145 is disposed in an orthogonal state with respect to the respective planes of the coupling portion 142 and the electric wire connecting portion 143. The second joining portion 146 is disposed on the same plane as the electric wire connecting portion 143. In the junction bus bar 140, the end portion of the coupling portion 142 and the end portion of the second joining portion 146 (the end portion on the side opposite to the arrangement of the electric wire connecting portion 143) are connected by the first joining portion 145. That is, since each of the terminal portions 131 and the coupling portions 132 of the two bus bars 130 of the present modified example is connected on the same plane in the same direction, the junction bus bar 140 of this example has a shape having only one electric wire connecting portion 133, and the terminal portion 131 and the plurality of terminal portions 141 are connected by the rectangular coupling portion 142 on the same plane.

In this example, the respective electric wire connecting portions 133 and 143 of the bus bar 130 and the junction bus bar 140 are used as the power supply terminal portions 133 and 143. Therefore, in this example, the harness terminal fitted to the power supply terminal portions 133 and 143 serves as the power supply terminal 150, and the power supply terminal 150 is electrically connected to the power supply side via the electric wire 220 (FIGS. 17 to 19).

In the terminal accommodating body 3 of this example, an accommodating chamber 30 for accommodating the electric wire connecting portion 133 of the bus bar 130 is provided for each electrical connecting space 20 (FIGS. 14 to 19). In this example, since the electric wire connecting portion 133 is used as the power supply terminal portion 133, the power supply terminal portion 133 of the bus bar 130 and the power supply terminal 150 are accommodated in the respective accommodating chambers 30. In each accommodating chamber 30, the power supply terminal portion 133 and the power supply terminal 150 are physically and electrically connected in the chamber. In addition, in the accommodating chamber 30 of the first electrical connecting space 20X, the electric wire connecting portion 143 of the junction bus bar 140 can be accommodated (FIG. 19). In this example, since the electric wire connecting portion 143 is used as the power supply terminal portion 143, the power supply terminal portion 143 of the junction bus bar 140 and the power supply terminal 150 are accommodated in the accommodating chamber 30 of the first electrical connecting space 20X. In the accommodating chamber 30, the power supply terminal portion 143 and the power supply terminal 150 are physically and electrically connected in the chamber.

In this way, the accommodating chamber 30 of this example is used as the power supply terminal accommodating chamber 30 that accommodates either one of the electric wire connecting portions (power supply terminal portions) 133 and 143 and the power supply terminal 150. Therefore, in this example, the respective electric wire connecting portions (power supply terminal portions) 133 and 143 are formed in the same shape. Further, each of the accommodating chambers (power supply terminal accommodating chambers) 30 is configured such that at least the electric wire connecting portion (power supply terminal portion) 133 of the bus bar 130 and the electric wire connecting portion (power supply terminal portion) 143 of the junction bus bar 140 are exchanged and, can be accommodated together with the power supply terminal 150. Each of the accommodating chambers (power supply terminal accommodating chambers) 30 is configured to be able to electrically connect one of the electric wire connecting portions (power supply terminal portions) 133 and 143 in the bus bar 130 and the junction bus bar 140 to the power supply terminal 150 in the chamber.

Further, in the terminal accommodating body 3, an accommodating chamber 81 for accommodating the first joining portion 135 of the bus bar 130, and the accommodating chamber 82 for accommodating the second joining portion 136 of the bus bar 130 are provided for each electrical connecting space 20 (FIG. 15). The first joining portion 145 and the second joining portion 146 of the junction bus bar 140 are accommodated in the respective accommodating chambers 81 and 82 of the first electrical connecting space 20X. In the same electrical connecting space 20 of the terminal accommodating body 3, an inter-chamber inserting portion 23a is provided between the accommodating chambers 81 and the terminal accommodating chamber 21 (including the common accommodating chamber 21C and the junction accommodating chamber 21C) disposed adjacent to each other, between accommodating chamber 81 and the accommodating chamber 82, and between the accommodating chamber 82 and the accommodating chamber 30 (the power supply terminal accommodating chamber 30), respectively. Further, in the terminal accommodating body 3, the inter-chamber inserting portion 23a is also provided between the terminal accommodating chambers 21 (including the common accommodating chambers 21C and the junction accommodating chambers 21C) and the inter-chamber communicating portion 70 of the first electrical connecting spaces 20X disposed adjacent to each other, and between the accommodating chamber 81 and the inter-chamber communicating portion 70 of the second electrical connecting space 20Y. Therefore, the terminal accommodating body 3 can accommodate the bus bar 130 in each of the first electrical connecting space 20X and the second electrical connecting space 20Y, and can accommodate junction bus bar 140 over the first electrical connecting space 20X and the second electrical connecting space 20Y.

Here, the bus bar 130 and the junction bus bar 140 of this modified example are provided with holding target portions 137 and 147 for holding the terminal accommodating body 3 in an accommodated state (FIGS. 20 and 21). In the terminal accommodating body 3 of this modified example, a bus bar holding portion 90 which holds the bus bar 130 and the junction bus bar 140 via the holding target portions 137 and 147 is provided (FIG. 15). In this example, the holding target portions 137 and 147 are formed as through-holes, and the bus bar holding portion 90 is formed as having a claw portion 91 to be hooked on the wall surface of the through-hole together with the insertion into the through-hole. For example, the bus bar holding portion 90 is provided with a claw portion 91 on the free end side of a flexible portion (not illustrated) having flexibility.

The bus bar 130 has an extending portion 138 which extends along the arrangement direction of the terminal portions 131 on the same plane as the coupling portion 132, at the end portion of the coupling portion 132 on the side opposite to the first joining portion 135 side (FIG. 20). In the bus bar 130, one holding target portion 137 is provided for each of the second joining portion 136 and the extending portion 138. Therefore, in the accommodating chamber 82, the bus bar holding portion 90 to be inserted into the holding target portion 137 of the second joining portion 136 is provided, together with the accommodation of the second joining portion 136. On the other hand, an accommodating chamber 83 for accommodating the extending portion 138 is provided for each electrical connecting space 20 in the terminal accommodating body 3 (FIGS. 14 to 19). The bus bar holding portion 90 to be inserted into the holding target portion 137 of the extending portion 138 is provided in the chamber of the accommodating chamber 83. In the terminal accommodating body 3 of this modified example, the accommodating chamber 83 and the inter-chamber communicating portion 70 of the first electrical connecting space 20X are used in common, and the bus bar holding portion 90 is provided in the inter-chamber communicating portion 70.

The junction bus bar 140 has an extending portion 148 which extends in the arrangement direction of the terminal portions 141 on the same plane as the coupling portion 142, at the end portion of the coupling portion 142 on the side opposite to the first joining portion 145 side (FIG. 21). In the junction bus bar 140, one holding target portion 147 is provided for each of the coupling portion 142, the second joining portion 146, and the extending portion 148. A part of the coupling portion 142 is accommodated in the inter-chamber communicating portion 70 as described above. Therefore, the holding target portion 147 of the coupling portion 142 is formed in accordance with the arrangement of the bus bar holding portion 90 provided in the inter-chamber communicating portion 70 (the accommodating chamber 83 of the first electrical connecting space 20X), and the claw portions 91 of the bus bar holding portion 90 is inserted. Further, the holding target portion 147 of the second joining portion 146 is formed in accordance with the arrangement of the bus bar holding portion 90 provided in the accommodating chamber 82 of the first electrical connecting space 20X, and the claw portion 91 of the bus bar holding portion 90 is inserted. Further, the holding target portion 147 of the extending portion 148 is formed in accordance with the arrangement of the bus bar holding portion 90 provided in the accommodating chamber 83 of the second electrical connecting space 20Y, and the claw portion 91 of the bus bar holding portion 90 is inserted.

Hereinafter, some examples of use examples of the terminal accommodating body 3 of this modified example will be described. In this description, it is assumed that three electronic components 210 as fuses are accommodated in each of the first electrical connecting space 20X and the second electrical connecting space 20Y, and one terminal 212 of the electronic component 210 is accommodated in all the terminal accommodating chambers 21 of the first electrical connecting space 20X and the second electrical connecting space 20Y.

Figure 16:
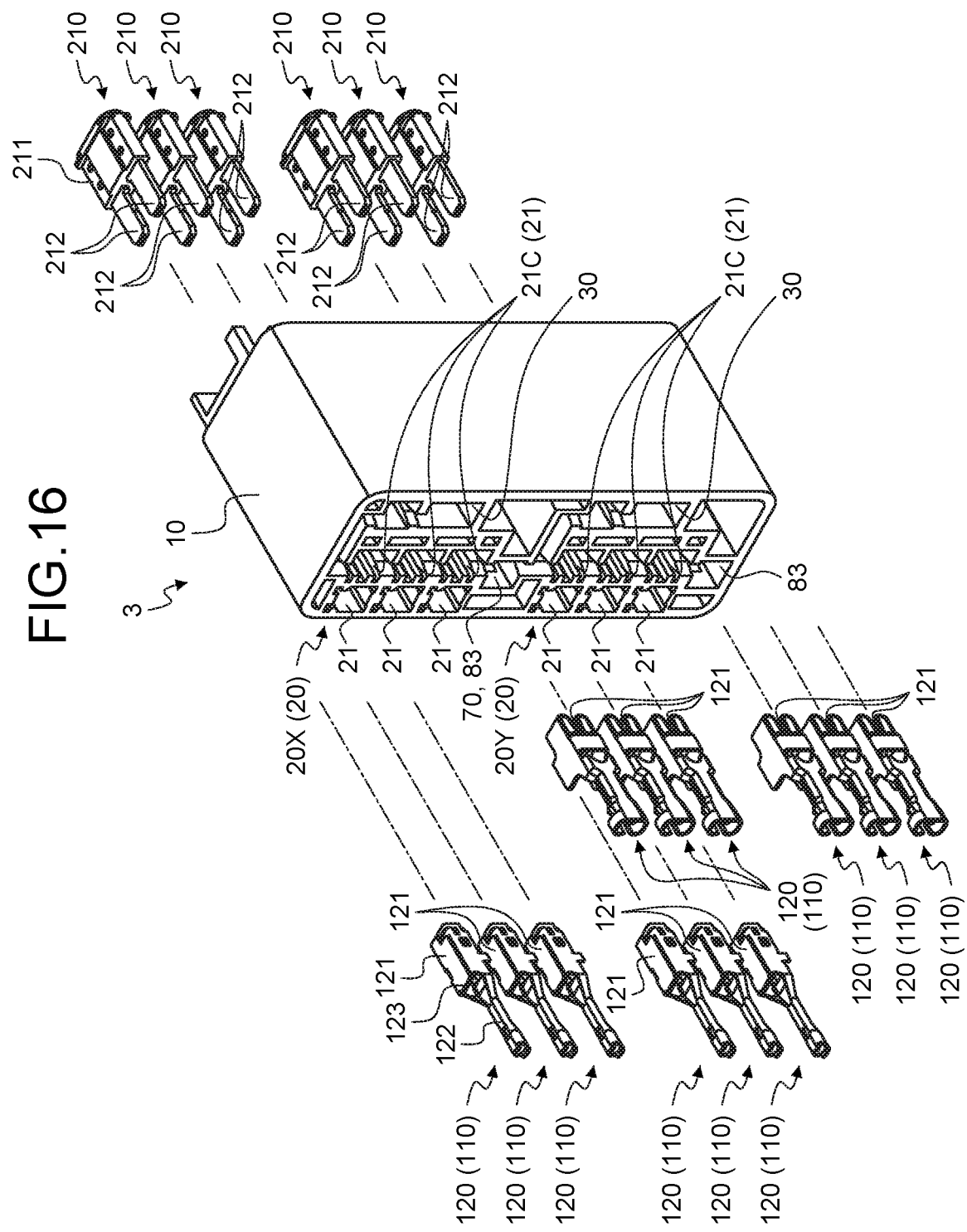
FIG. 16 is an exploded perspective view illustrating one usage example of the terminal accommodating body of the second modified example.
Figure 22:
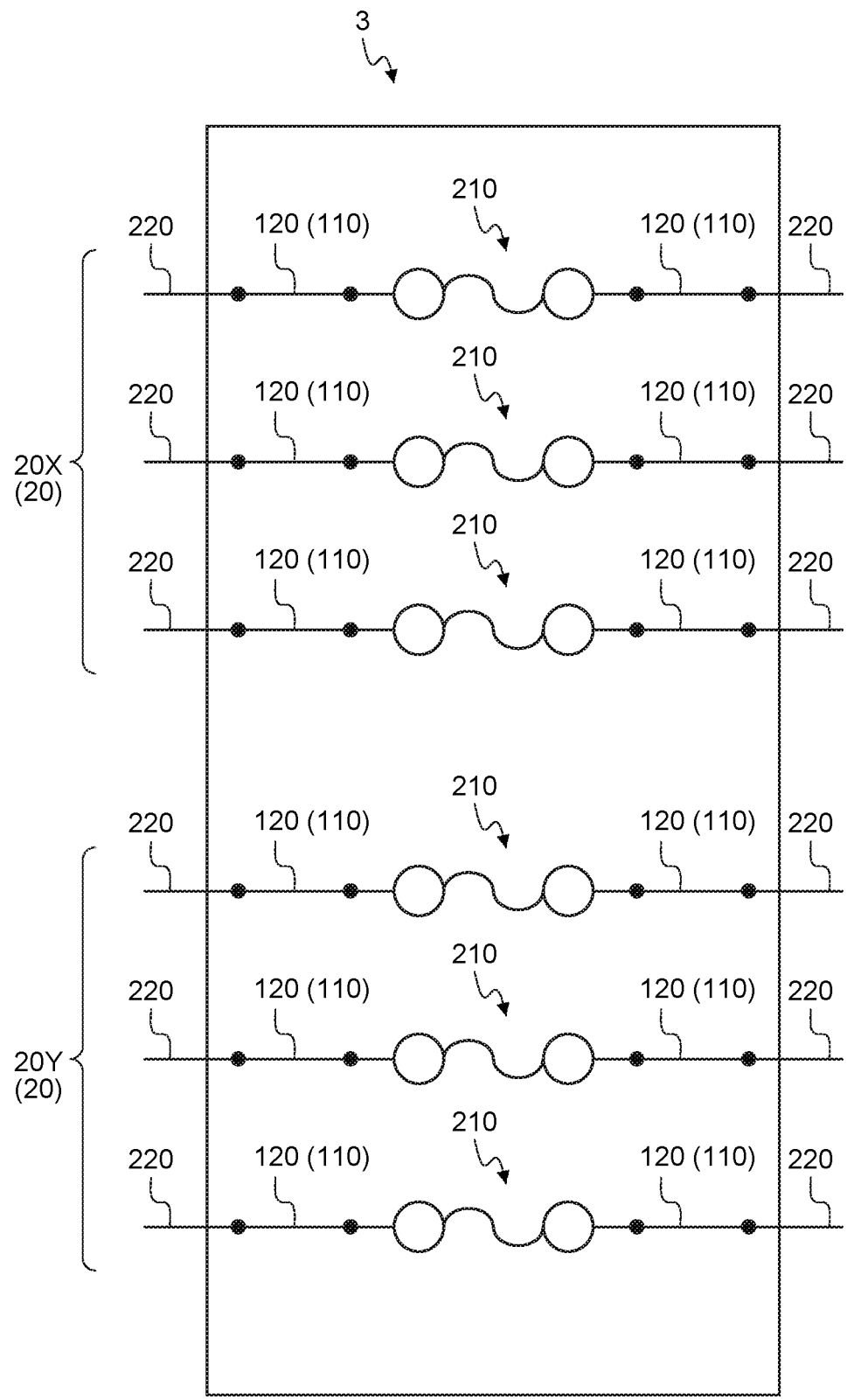
FIG. 22 is a diagram illustrating a circuit configuration of the usage example of FIG. 16.

As illustrated in FIG. 16, the terminal accommodating body 3 of this modified example can accommodate the coupling terminals 120 one by one in all the terminal accommodating chambers 21, thereby creating the circuit configuration illustrated in FIG. 22. For example, in this case, a circuit which connects one terminal 212 and the other terminal 212 of the electronic component 210 is created for each electronic component 210.

Figure 23:
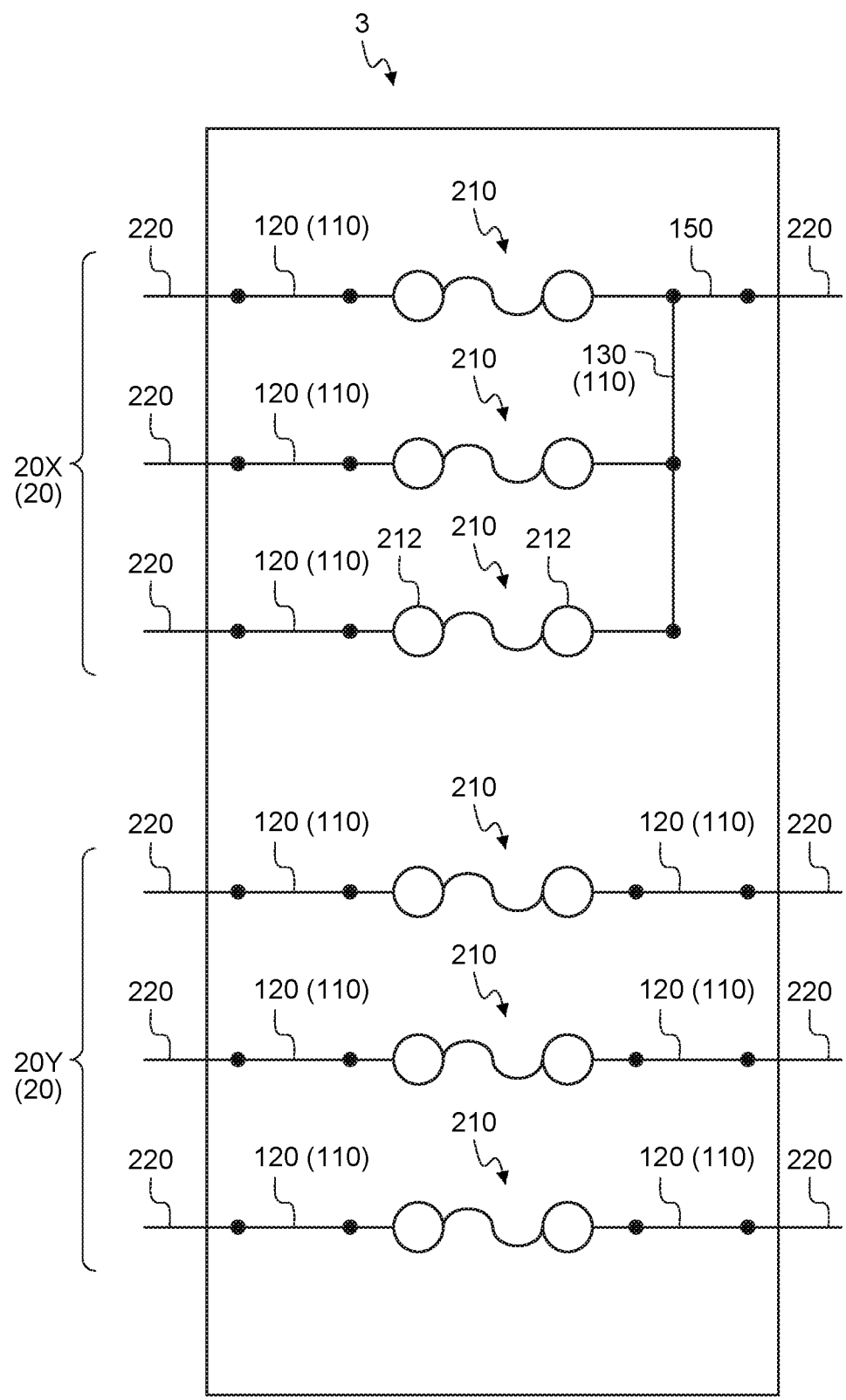
FIG. 23 is a diagram illustrating a circuit configuration of the usage example of FIG. 17.

Further, as illustrated in FIG. 17, according to the terminal accommodating body 3 of this modified example, in the configuration of FIG. 16, the three coupling terminals 120 of the three common accommodating chambers (junction accommodating chambers) 21C in the first electrical connecting space 20X (which may be the second electrical connecting space 20Y) are replaced with one bus bar 130, and the power supply terminal 150 can be accommodated in the accommodating chamber (power supply terminal accommodating chamber) 30. As a result, the terminal accommodating body 3 can produce the circuit configuration illustrated in FIG. 23. In this case, in the terminal accommodating body 3 of this modified example, the power supply can be distributed to the three power supply paths in the first electrical connecting space 20X, and an electronic component (fuse) 210 can be interposed on each power supply path. Furthermore, the terminal accommodating body 3 can create a circuit for connecting one terminal 212 and the other terminal 212 of the electronic component 210 in the second electrical connecting space 20Y for each electronic component 210.

Figure 24:
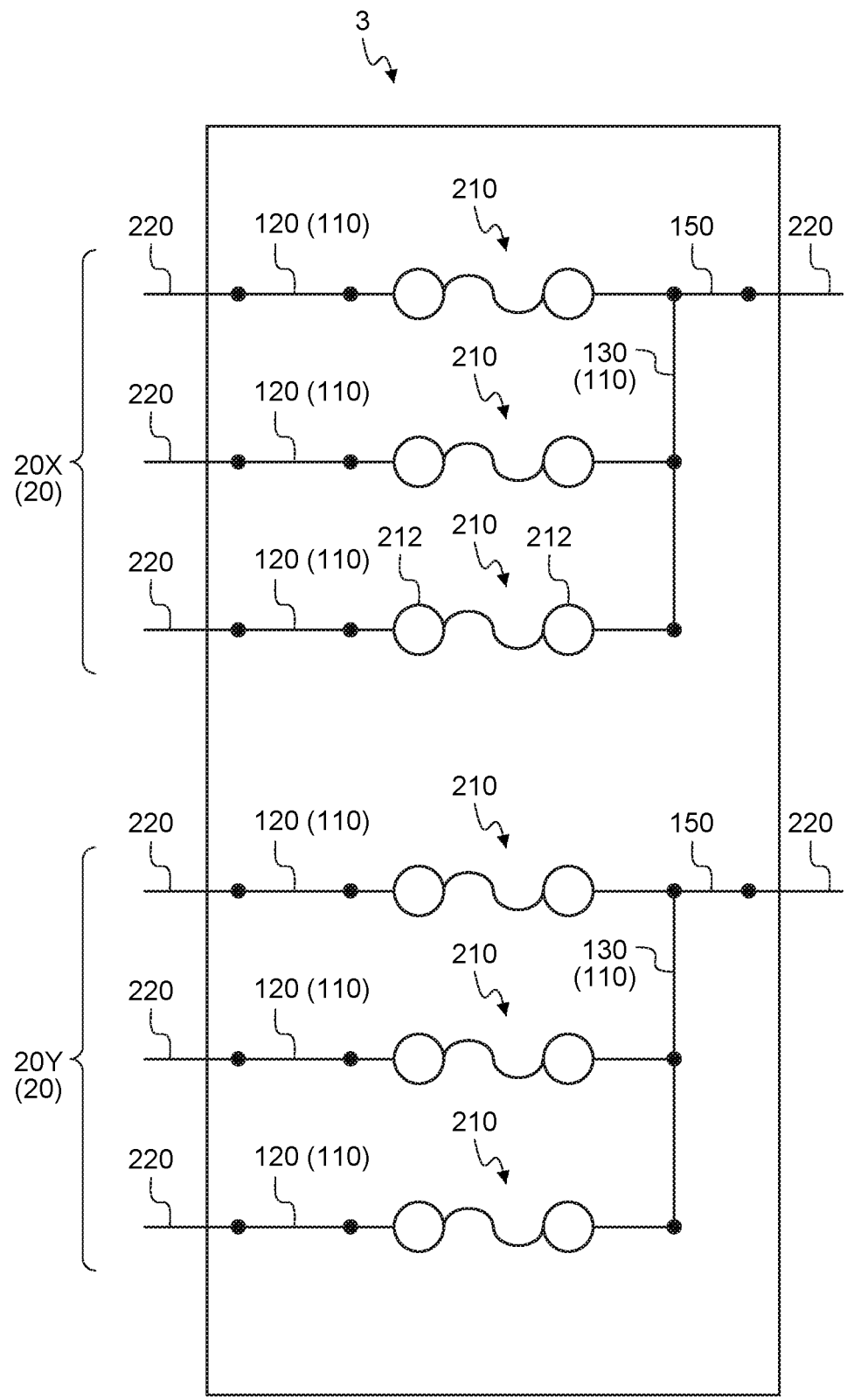
FIG. 24 is a diagram illustrating a circuit configuration of the usage example of FIG. 18.

Further, as illustrated in FIG. 18, according to the terminal accommodating body 3 of this modified example, in the configuration of FIG. 16, three coupling terminals 120 of the three common accommodating chambers (junction accommodating chambers) 21C in the first electrical connecting space 20X are replaced with one bus bar 130, the three coupling terminals 120 of the three common accommodating chambers (junction accommodating chambers) 21C in the second electrical connecting space 20Y are replaced with one bus bar 130, and the power supply terminal 150 can be accommodated in the accommodating chambers (power supply terminal accommodating chamber) 30 of the first electrical connecting space 20X and the second electrical connecting space 20Y, respectively. As a result, the terminal accommodating body 3 can produce the circuit configuration illustrated in FIG. 24. In this case, in the terminal accommodating body 3 of this modified example, it is possible to distribute the power supply to the three power supply paths in both the first electrical connecting space 20X and the second electrical connecting space 20Y, and the electronic component (fuse) 210 can be interposed on the respective power supply paths.

Figure 25:
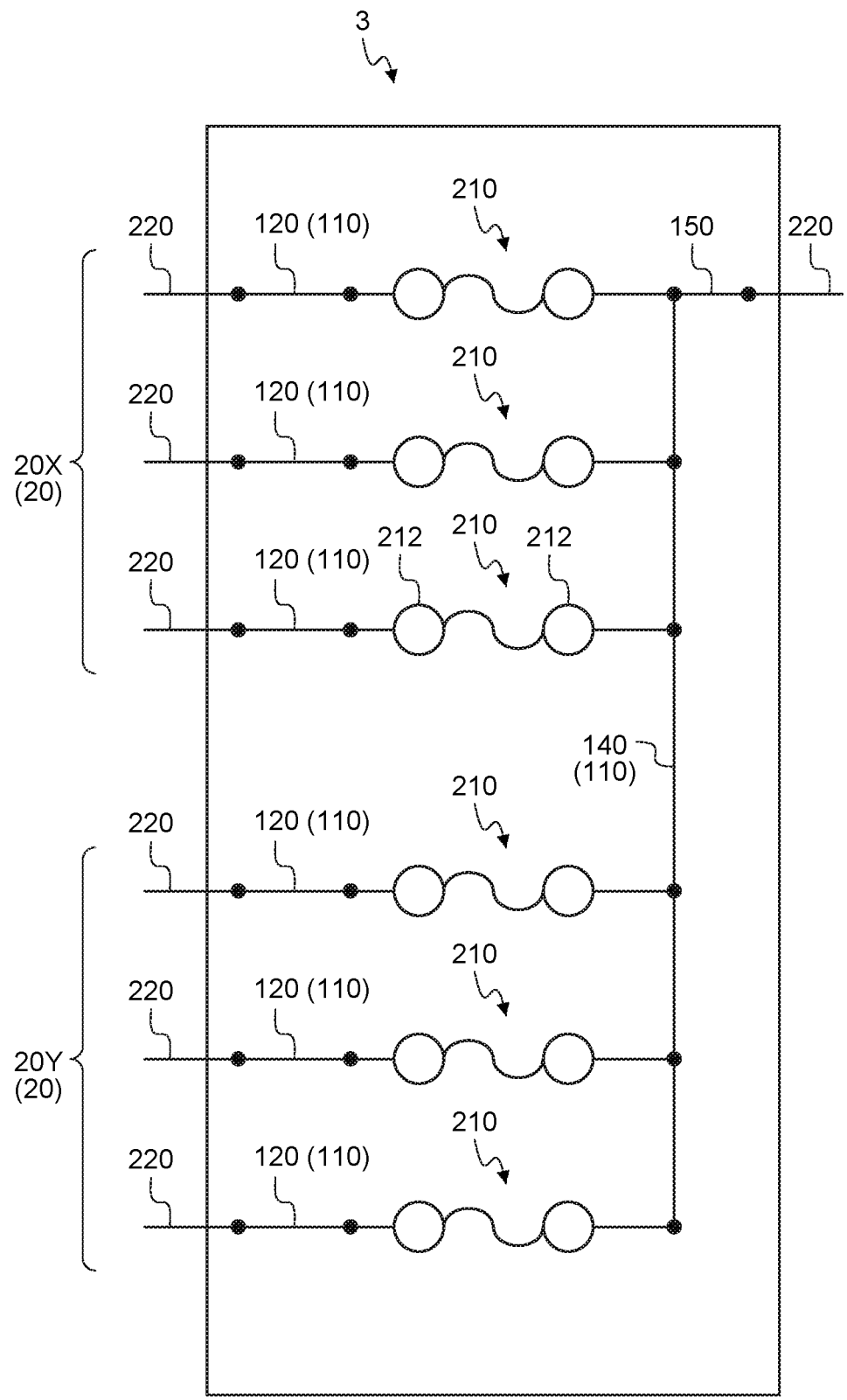
FIG. 25 is a diagram illustrating a circuit configuration of the usage example of FIG. 19.

Further, as illustrated in FIG. 19, according to the terminal accommodating body 3 of the present modified example, in the configuration of FIG. 16, all the coupling terminals 120 of all the common accommodating chambers (junction accommodating chambers) 21C in the first electrical connecting space 20X and the second electrical connecting space 20Y are replaced with one junction bus bar 140, and the power supply terminal 150 can be accommodated in the accommodating chamber (power supply terminal accommodating chamber) 30 of the first electrical connecting space 20X. As a result, the terminal accommodating body 3 can produce the circuit configuration illustrated in FIG. 25. In this case, in the terminal accommodating body 3 of this modified example, the power supply is distributed to the first electrical connecting space 20X and the second electrical connecting space 20Y, the power supply can be distributed to the three power supply paths on both the first electrical connecting space 20X and the second electrical connecting space 20Y, and it is possible to interpose an electronic component (fuse) 210 on each power supply path.

As described above, the terminal accommodating body 3 of this modified example has a plurality of electrical connecting spaces 20 similar to those of the embodiment and the first modified example. Therefore, in the terminal accommodating body 3, the terminal accommodating chamber 21 can be shared by the coupling terminal 120 and the bus bar 130 for each electrical connecting space 20. Therefore, in the respective electrical connecting spaces 20 of the terminal accommodating body 3, for example, since the coupling terminal 120 and the bus bar 130 can be appropriately used separately for each specification of the vehicle, it is possible to share the terminal accommodating body 3 among vehicles having different specifications. Therefore, since the terminal accommodating body 3 of this modified example can simplify management relating to the assembling work of the terminals 110, the electronic components 210, and the like in the workplace for each electrical connecting space 20, the cost can be reduced.

Further, in the terminal accommodating body 3 of this modified example, since it is possible to connect the adjacent electrical connecting spaces 20 with one junction bus bar 140, it is possible to electrically connect the terminals 212 of the plurality of electronic components 210 accommodated in the respective electrical connecting spaces 20 by the junction bus bar 140, or it is possible to supply power to the terminals 212 of the plurality of electronic components 210 accommodated in each of the electrical connecting spaces 20 by one junction bus bar 140. Therefore, as compared with the embodiment and the first modified example, the terminal accommodating body 3 can appropriately use the coupling terminal 120, the bus bar 130, and the junction bus bar 140 so as to further correspond to specifications. Thus, it is possible to provide further sharing in the vehicles having different specifications. Although the terminal accommodating body 3 of this modified example further corresponds to the specifications as compared to the embodiment and the first modified example, like the embodiment and the first modified example, since it is possible to simplify management relating to the assembling work of the terminal 110, the electronic component 210 or the like in the workplace, the cost can be reduced.

Since the wire harness WH of this modified example includes the terminal accommodating body 3, the effect of the terminal accommodating body 3 can be exerted.

In the terminal accommodating body according to the present embodiments, an inter-chamber inserting portion into which a bus bar can be inserted is provided on a partition wall between adjacent common accommodating chambers, and a terminal holding portion which holds the coupling terminal without disturbing the accommodation of the bus bar is provided. Therefore, in the terminal accommodating body, the terminal accommodating chamber can be shared by the coupling terminal and the bus bar. Further, since the wire harness according to the present embodiments includes the terminal accommodating body, the effect of the terminal accommodating body can be exerted.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal accommodating body comprising:
    terminal accommodating chambers that are each a space capable of accommodating a coupling terminal capable of being electrically connected to a terminal of an electronic component, and are provided for each of the plurality of coupling terminals; and
    a terminal holding portion that holds the coupling terminal accommodated in the terminal accommodating chamber, wherein
    in all the terminal accommodating chambers, a plurality of common accommodating chambers in which the coupling terminal and one terminal portion in a one plate-like bus bar having a plurality of terminal portions electrically connectable to the terminal of the electronic component are capable of being replaced and accommodated are set, the plurality of common accommodating chambers being allocated to each of the terminal portions of the bus bar, and a partition wall between the adjacent common accommodating chambers has an inter-chamber inserting portion into which the coupling portion is inserted in an accommodated state of the terminal portion to the common accommodating chamber, in order to accommodate a coupling portion for connecting the adjacent terminal portions of the bus bar in the common accommodating chamber, and
    the terminal holding portion of the common accommodating chamber is provided for each of the common accommodating chambers so as not to obstruct accommodation of the bus bar to the common accommodating chamber and the inter-chamber inserting portion.

2. The terminal accommodating body according to claim 1, wherein
    the terminal holding portion is a locking portion which protrudes in the terminal accommodating chamber and locks a locked portion of the coupling terminal accommodated in the terminal accommodating chamber, and
    in the terminal holding portion of the common accommodating chamber or between the terminal holding portion and an inner wall surface of the common accommodating chamber, an interior inserting portion into which the bus bar is inserted in an accommodated state of the terminal portion to the common accommodating chamber is formed.

3. The terminal accommodating body according to claim 2, wherein
    when a bus bar holding portion for holding the bus bar is provided in the common accommodating chamber or the inter-chamber inserting portion, the bus bar holding portion is a locking portion which protrudes from a wall surface existing inside the common accommodating chamber or a wall surface of the inter-chamber inserting portion, and locks the locked portion of the bus bar when the terminal portion is accommodated in the common accommodating chamber, and the bus bar holding portion is disposed so as not to obstruct accommodation of the coupling terminal to the common accommodating chamber.

4. The terminal accommodating body according to claim 2, further comprising:
    at least a first accommodating chamber group in which the plurality of terminal accommodating chambers is arranged in a row, and a second accommodating chamber group in which the same number of the common accommodating chambers paired individually with the respective terminal accommodating chambers of the first accommodating chamber group are arranged in a row, wherein
    the inter-chamber inserting portion is provided in the partition wall between the adjacent common accommodating chambers of the second accommodating chamber group.

5. The terminal accommodating body according to claim 2, wherein
    a plurality of electrical connecting spaces including all the terminal accommodating chambers is arranged side by side, and is formed to be able to accommodate one plate-like junction bus bar over at least two adjacent electrical connecting spaces in the plurality of electrical connecting spaces,
    in the respective common accommodating chambers in the two adjacent electrical connecting spaces, at least one common accommodating chamber of one electrical connecting space and at least one common accommodating chamber of the other electrical connecting space are used as junction accommodating chambers, and each of the junction accommodating chambers is formed so that the coupling terminal, one terminal portion of the bus bar, and one terminal portion of the junction bus bar are capable of being replaced and accommodated, and between the adjacent junction accommodating chambers of one electrical connecting space and the adjacent junction accommodating chambers of the other electrical connecting space, an inter-chamber communicating portion which allows the chambers of the respective junction accommodating chambers to communicate with each other and accommodates a coupling portion which connects the adjacent terminal portions of the junction bus bar is provided.

6. The terminal accommodating body according to claim 5, wherein the electrical connecting space includes a power supply terminal accommodating chamber which accommodates a power supply terminal electrically connected to a power supply, and the power supply terminal accommodating chamber is formed so that at least the power supply terminal portion of the bus bar and the power supply terminal portion of the junction bus bar can be replaced and can be accommodated together with the power supply terminal, and any one of the power supply terminal portions in the bus bar and the junction bus bar in the chamber can be electrically connected to the power supply terminal.

7. The terminal accommodating body according to claim 1, wherein when a bus bar holding portion for holding the bus bar is provided in the common accommodating chamber or the inter-chamber inserting portion, the bus bar holding portion is a locking portion which protrudes from a wall surface existing inside the common accommodating chamber or a wall surface of the inter-chamber inserting portion, and locks the locked portion of the bus bar when the terminal portion is accommodated in the common accommodating chamber, and the bus bar holding portion is disposed so as not to obstruct accommodation of the coupling terminal to the common accommodating chamber.

8. The terminal accommodating body according to claim 7, further comprising:

at least a first accommodating chamber group in which the plurality of terminal accommodating chambers is arranged in a row, and a second accommodating chamber group in which the same number of the common accommodating chambers paired individually with the respective terminal accommodating chambers of the first accommodating chamber group are arranged in a row, wherein the inter-chamber inserting portion is provided in the partition wall between the adjacent common accommodating chambers of the second accommodating chamber group.

9. The terminal accommodating body according to claim 7, wherein a plurality of electrical connecting spaces including all the terminal accommodating chambers is arranged side by side, and is formed to be able to accommodate one plate-like junction bus bar over at least two adjacent electrical connecting spaces in the plurality of electrical connecting spaces, in the respective common accommodating chambers in the two adjacent electrical connecting spaces, at least one common accommodating chamber of one electrical connecting space and at least one common accommodating chamber of the other electrical connecting space are used as junction accommodating chambers, and each of the junction accommodating chambers is formed so that the coupling terminal, one terminal portion of the bus bar, and one terminal portion of the junction bus bar are capable of being replaced and accommodated, and between the adjacent junction accommodating chambers of one electrical connecting space and the adjacent junction accommodating chambers of the other electrical connecting space, an inter-chamber communicating portion which allows the chambers of the respective junction accommodating chambers to communicate with each other and accommodates a coupling portion which connects the adjacent terminal portions of the junction bus bar is provided.

10. The terminal accommodating body according to claim 9, wherein the electrical connecting space includes a power supply terminal accommodating chamber which accommodates a power supply terminal electrically connected to a power supply, and the power supply terminal accommodating chamber is formed so that at least the power supply terminal portion of the bus bar and the power supply terminal portion of the junction bus bar can be replaced and can be accommodated together with the power supply terminal, and any one of the power supply terminal portions in the bus bar and the junction bus bar in the chamber can be electrically connected to the power supply terminal.

11. The terminal accommodating body according to claim 1, further comprising:

at least a first accommodating chamber group in which the plurality of terminal accommodating chambers is arranged in a row, and a second accommodating chamber group in which the same number of the common accommodating chambers paired individually with the respective terminal accommodating chambers of the first accommodating chamber group are arranged in a row, wherein the inter-chamber inserting portion is provided in the partition wall between the adjacent common accommodating chambers of the second accommodating chamber group.

12. The terminal accommodating body according to claim 11, wherein a plurality of electrical connecting spaces including all the terminal accommodating chambers is arranged side by side, and is formed to be able to accommodate one plate-like junction bus bar over at least two adjacent electrical connecting spaces in the plurality of electrical connecting spaces, in the respective common accommodating chambers in the two adjacent electrical connecting spaces, at least one common accommodating chamber of one electrical connecting space and at least one common accommodating chamber of the other electrical connecting space are used as junction accommodating chambers, and each of the junction accommodating chambers is formed so that the coupling terminal, one terminal portion of the bus bar, and one terminal portion of the junction bus bar are capable of being replaced and accommodated, and between the adjacent junction accommodating chambers of one electrical connecting space and the adjacent junction accommodating chambers of the other electrical connecting space, an inter-chamber communicating portion which allows the chambers of the respective junction accommodating chambers to communicate with each other and accommodates a coupling portion which connects the adjacent terminal portions of the junction bus bar is provided.

13. The terminal accommodating body according to claim 12, wherein
the electrical connecting space includes a power supply terminal accommodating chamber which accommodates a power supply terminal electrically connected to a power supply, and
the power supply terminal accommodating chamber is formed so that at least the power supply terminal portion of the bus bar and the power supply terminal portion of the junction bus bar can be replaced and can be accommodated together with the power supply terminal, and any one of the power supply terminal portions in the bus bar and the junction bus bar in the chamber can be electrically connected to the power supply terminal.

14. The terminal accommodating body according to claim 1, wherein
a plurality of electrical connecting spaces including all the terminal accommodating chambers is arranged side by side, and is formed to be able to accommodate one plate-like junction bus bar over at least two adjacent electrical connecting spaces in the plurality of electrical connecting spaces,
in the respective common accommodating chambers in the two adjacent electrical connecting spaces, at least one common accommodating chamber of one electrical connecting space and at least one common accommodating chamber of the other electrical connecting space are used as junction accommodating chambers, and each of the junction accommodating chambers is formed so that the coupling terminal, one terminal portion of the bus bar, and one terminal portion of the junction bus bar are capable of being replaced and accommodated, and
between the adjacent junction accommodating chambers of one electrical connecting space and the adjacent junction accommodating chambers of the other electrical connecting space, an inter-chamber communicating portion which allows the chambers of the respective junction accommodating chambers to communicate with each other and accommodates a coupling portion which connects the adjacent terminal portions of the junction bus bar is provided.

15. The terminal accommodating body according to claim 14, wherein
the electrical connecting space includes a power supply terminal accommodating chamber which accommodates a power supply terminal electrically connected to a power supply, and
the power supply terminal accommodating chamber is formed so that at least the power supply terminal portion of the bus bar and the power supply terminal portion of the junction bus bar can be replaced and can be accommodated together with the power supply terminal, and any one of the power supply terminal portions in the bus bar and the junction bus bar in the chamber can be electrically connected to the power supply terminal.

16. The terminal accommodating body according to claim 15, wherein
the two electrical connecting spaces are provided.

17. The terminal accommodating body according to claim 14, wherein
the two electrical connecting spaces are provided.

18. A wire harness comprising:
an electronic component;
a terminal accommodating body that is a space capable of accommodating a coupling terminal capable of being electrically connected to a terminal of the electronic component, the terminal accommodating body having terminal accommodating chambers provided for each of a plurality of coupling terminals, and a terminal holding portion which holds the coupling terminal accommodated in the terminal accommodating chambers; and
an electric wire that is directly or indirectly electrically connected to the coupling terminal, wherein
in all the terminal accommodating chambers, a plurality of common accommodating chambers in which the coupling terminal and one terminal portion in a one plate-like bus bar having a plurality of terminal portions electrically connectable to the terminal of the electronic component are capable of being replaced and accommodated are set, the plurality of common accommodating chambers being allocated to each of the terminal portions of the bus bar, and a partition wall between the adjacent common accommodating chambers has an inter-chamber inserting portion into which the coupling portion is inserted in an accommodated state of the terminal portion to the common accommodating chamber, in order to accommodate a coupling portion for connecting the adjacent terminal portions of the bus bar in the common accommodating chamber, and
the terminal holding portion of the common accommodating chamber is provided for each of the common accommodating chambers so as not to obstruct accommodation of the bus bar to the common accommodating chamber and the inter-chamber inserting portion.

* * * * *